United States Patent
Kern et al.

(10) Patent No.: US 11,331,171 B2
(45) Date of Patent: May 17, 2022

(54) IMPLANT ANALOG

(71) Applicant: Straumann Holding AG, Basel (CH)

(72) Inventors: Philippe Kern, Basel (CH); Boris Martin, Basel (CH); Bruno Zberg, Basel (CH); Andreas Gfeller, Basel (CH)

(73) Assignee: Straumann Holding AG, Basel (CH)

( * ) Notice: Subject to any disclaimer, the term of this patent is extended or adjusted under 35 U.S.C. 154(b) by 241 days.

(21) Appl. No.: 16/494,371

(22) PCT Filed: Mar. 19, 2018

(86) PCT No.: PCT/EP2018/056860
§ 371 (c)(1),
(2) Date: Sep. 16, 2019

(87) PCT Pub. No.: WO2018/172270
PCT Pub. Date: Sep. 27, 2018

(65) Prior Publication Data
US 2020/0085543 A1 Mar. 19, 2020

(30) Foreign Application Priority Data
Mar. 20, 2017 (EP) .................... 17161931

(51) Int. Cl.
*A61C 8/00* (2006.01)
(52) U.S. Cl.
CPC .......... *A61C 8/0059* (2013.01); *A61C 8/0054* (2013.01); *A61C 8/0066* (2013.01); *A61C 8/0093* (2013.01)

(58) Field of Classification Search
CPC ... A61C 8/0048; A61C 8/0059; A61C 8/0062; A61C 8/0068; A61C 8/0071;
(Continued)

(56) References Cited

U.S. PATENT DOCUMENTS 4,955,811 A * 9/1990 Lazzara ............... A61C 8/0001
433/173
5,829,981 A 11/1998 Ziegler
(Continued)

FOREIGN PATENT DOCUMENTS

| | | |
|---|---|---|
| EP | 2389891 | 11/2011 |
| JP | 2015510425 | 4/2015 |

(Continued)

*Primary Examiner* — Ralph A Lewis
(74) *Attorney, Agent, or Firm* — Volpe Koenig

(57) ABSTRACT

A dental implant system including a dental implant (1) and an associated implant analog (50), the implant extending along a longitudinal axis (L1) from an apical end (101) to a coronal end (102) and having an external surface for anchoring and osseointegrating in bone, a coronal end portion (105) having abutment connection geometry for cooperating with an abutment which can be seated in one or more defined positions on the implant, the abutment connection geometry having a coronally facing abutment contact surface (128) which extends around the full circumference of the implant, and in use directly contacts the abutment and provides a stop defining the axial location of the abutment relative to the implant, the coronal end portion further having a coronally facing prosthesis contact surface (129) located radially beyond the abutment contact surface, the prosthesis contact surface being a continuous surface extending around the full circumference of the implant.

19 Claims, 8 Drawing Sheets

(58) Field of Classification Search
CPC ... A61C 8/0053; A61C 8/0054; A61C 8/0065; A61C 8/0066
See application file for complete search history.

(56) References Cited

U.S. PATENT DOCUMENTS

| | | | |
|---|---|---|---|
| 5,934,906 A | 8/1999 | Phimmasone | |
| 6,068,478 A | 5/2000 | Grande et al. | |
| 6,540,514 B1 * | 4/2003 | Falk | A61C 8/0001 433/172 |
| 6,540,516 B1 | 4/2003 | Ziegler | |
| 9,775,688 B2 * | 10/2017 | Herweg | A61C 8/0001 |
| 2008/0241789 A1 | 10/2008 | Mundorf | |
| 2009/0081613 A1 * | 3/2009 | Ihde | A61C 8/0001 433/173 |
| 2011/0294093 A1 | 12/2011 | Herweg et al. | |
| 2015/0374466 A1 | 12/2015 | Jahn | |

FOREIGN PATENT DOCUMENTS

| | | | |
|---|---|---|---|
| JP | 2016513508 | 5/2016 | |
| JP | 2017029261 | 2/2017 | |
| WO | 9637161 | 11/1996 | |
| WO | WO-2006019225 A1 * | 2/2006 | A61C 8/0066 |

* cited by examiner

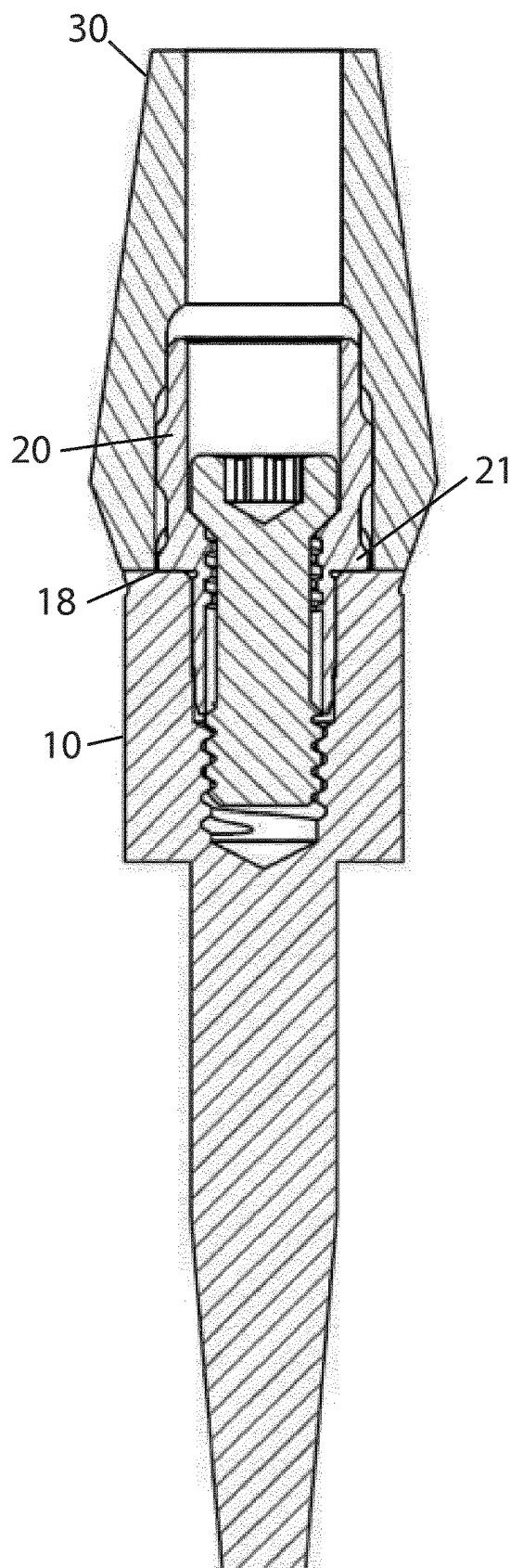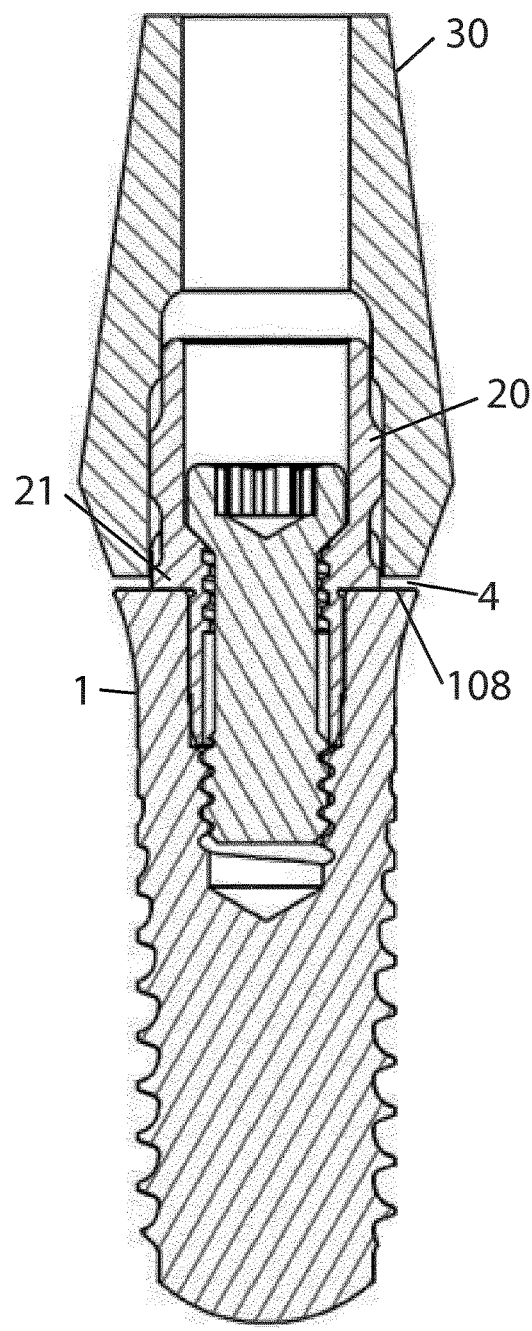
Fig 1.A
Fig 1.B

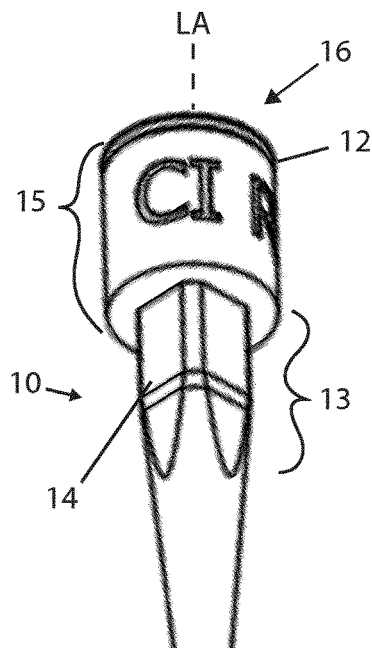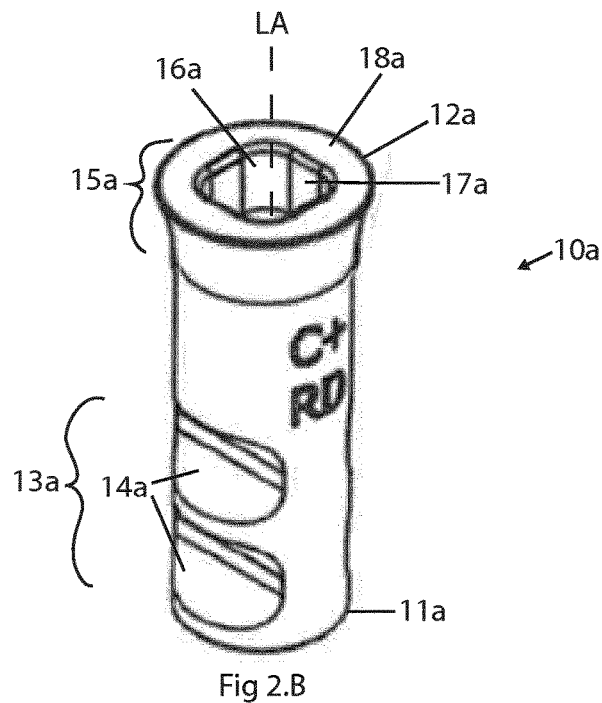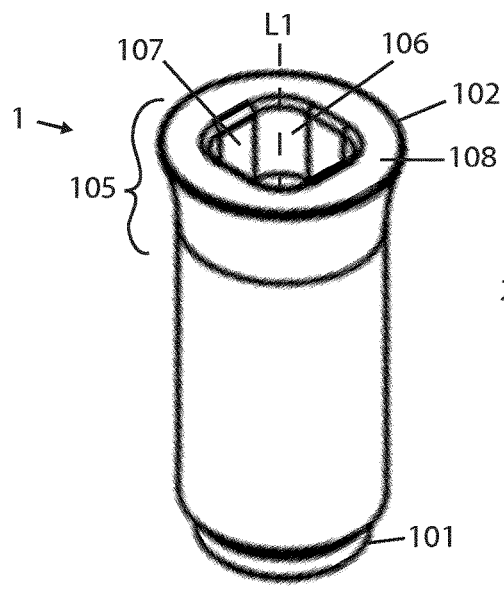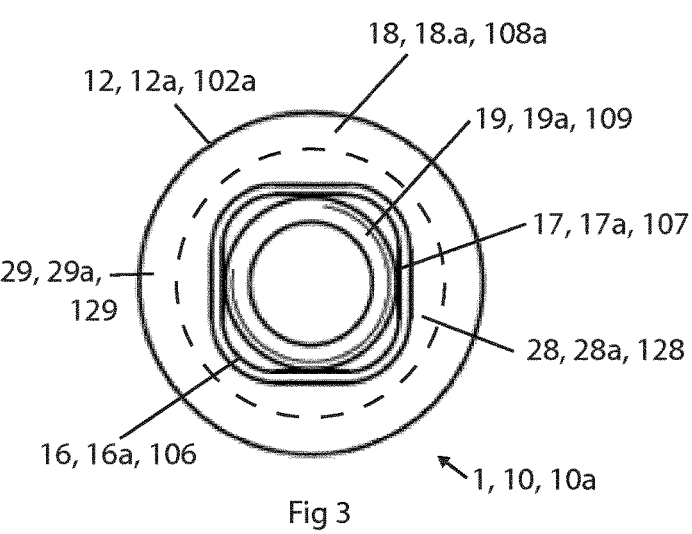

Fig 7.A

IMPLANT ANALOG

TECHNICAL FIELD

The invention relates to a dental implant analog having a surface provided for contact with a complementary surface of a prosthetic element, the analog surface being formed by circumferentially or radially spaced struts, thus forming a discontinuous surface to allow for drainage of a bonding agent applied to the prosthetic element.

BACKGROUND OF THE INVENTION

Dental implants are used to replace individual teeth or for anchoring more complex structures, which generally replace several or even all of the teeth. The materials used for dental implants are often titanium and alloys thereof and increasingly ceramic. These materials have the necessary strength for withstanding the mechanical loads that occur, and they are at the same time sufficiently biocompatible for osseointegration and long term use in the mouth.

Implants have two essential parts: an anchoring part and an abutment part. The anchoring part is embedded in the bone, where it osseointegrates with the bone tissue to provide a firm anchor for the prosthesis. The abutment extends into the oral cavity and provides a core support for the prosthesis. The desired prosthetic element (e.g. bridge or crown) is fastened over the abutment such that at least part of the abutment is housed within the prosthesis and provides core support to this.

The implant can be constructed in one part, such that the anchoring part and abutment part are produced in one integral, monolithic piece. Hence, in such implant systems, the integrated anchoring part and abutment are always positioned within the mouth at the same time and the single piece implant extends into the oral cavity to form a core support for the prosthesis.

However, implants are often constructed in two or more parts, in which case they consist of at least an anchoring component, often referred to in isolation as the implant, and a separate abutment, sometimes referred to as a spacer, or post. The anchoring component is usually either embedded completely in the bone, that is to say to the height of the alveolar crest, and is thus often referred to as a "bone level" implant" or protrudes by a few millimetres from the alveolar crest into the soft tissue, often known as a "tissue level" implant. The abutment is mounted either directly or indirectly to the anchoring component after the latter has become incorporated (osseointegrated) into the bone or directly after the anchoring component has been inserted. It can also be attached to the anchoring component prior to insertion. Most usually however the abutment is not mounted until after osseointegration.

In contrast to one piece implants, multi-part implants are more versatile, because the anchoring part and the abutment can be adapted to individual requirements. In particular the abutment shape and angulation, relative to the anchoring part, can be selected after implant insertion. This provides the surgeon with more flexibility and room for error in the placement of the implant. An additional advantage of multi-part implants is that the abutment can be made from a different material than the anchoring part.

Due to their versatility, multi-part, and particularly two-part, dental implants are more commonly used than one-piece implants, and it is this form of implant system with which the present invention is concerned. For the remainder of this specification therefore, unless specifically stated otherwise, the term "implant" will be used to denote the anchoring component of a multi-part implant, namely, the element which in use is anchored within the bone, and the term "abutment" will be used to denote a separate component which in use is connected, either directly or indirectly, to the implant and extends into the oral cavity to provide core support to a dental prosthesis.

An implant analog is a piece used to replicate the dental implant in a physical model of the patient's mouth. Such models are models of the oral cavity or parts of the oral cavity which may be obtained, for example, by traditional plaster casting or by laser sintering or the like making use of CAD data of patients. The resulting model, complete with implant analog, can be used by a dental technician to create a patient specific prosthesis for attachment to the implant already in situ within the patient's mouth. During this process the abutment is fastened to the analog, and in some cases modified, and the prosthesis is built up and shaped on top of this, using one of several known methods, e.g. lost-wax casting, veneering or casting onto a stock or custom coping, direct veneering onto the abutment etc.

Known implant analogs comprise an essentially identical reconstruction of the coronal end of the implant, including the abutment connection geometry, which enables the abutment to be fixedly connected to the implant, and the coronal end surface(s) of the implant. The coronal end of the implant usually comprises at least one coronally facing planar or tapered shoulder having a smooth, continuous surface for contact with the prosthesis and/or abutment. Usually this surface is circular symmetric about the longitudinal axis of the implant, although implants are also known which have a scalloped or slanted coronal end, i.e. a coronal end surface whose height undulates or otherwise changes about the longitudinal axis in order to more exactly follow the bone or soft tissue contour. The smooth, continuous nature of the shoulder provides a contact surface against which the prosthesis and/or abutment can abut around the whole circumference of the components, thus enabling good force transmission between them as well as creating a seal against bacteria.

The associated analog replicates the coronal end surface (s) of the implant such that the abutment can be placed in equivalent contact with the analog during the creation of the prosthesis and so that, when the prosthesis is intended to contact the implant, the prosthesis can be designed to sit flush on the implant surface. The apical end of the implant analog typically differs from the apical end of the implant and is shaped for fixation (either permanent or removable) within the model. As the analog is not used within the oral cavity of the patient and does not need to withstand the same mechanical forces, the material used to make the analog can also vary from the implant. For the same reason, the analog is also not subject to any surface treatment, such as sandblasting or acid etching, which the implant may undergo in order to improve osseointergration.

Examples of implant analogs, and the process of creating the models containing them, can be found in U.S. Pat. No. 6,068,478 and US2015/374466. Traditionally, the analog is firmly and immovably embedded within the model, however analogs also exist which can be removed and replaced in the model, see for example U.S. Pat. No. 5,934,906 and EP2389891.

Once the prosthesis is completed, the abutment and prosthesis are attached to the implant. Depending on the design of the implant system and dentist preference, this can be achieved in several ways. Sometimes the abutment will be screwed to the implant, either directly, or more usually indirectly using a separate screw. Alternatively, the abutment can be cemented to the implant. The prosthesis can also either be cemented or screwed to the abutment, either before or after the abutment is connected to the implant.

When the prosthesis is glued to the abutment, this can be carried out in situ within the patient's mouth. However, such in situ bonding is generally avoided as it is harder to clean up any overspill of cement in this environment compared to the dental lab. Therefore, when possible, bonding of the prosthesis to the abutment takes place in the laboratory. When the prosthesis is designed to abut the coronal end of the implant, this bonding takes place with the aid of the implant analog, to ensure that the prosthesis is connected to the abutment in a manner which will allow correct seating and sealing with the implant.

However, in this situation a problem can arise in that cement can become trapped between the coronal shoulder of the implant analog and the corresponding contact surface of the prosthesis. When the prosthesis is bonded to the abutment in situ within the mouth, such a cement layer between the implant and prosthesis does not cause any problems, and in fact helps to ensure a good seal between the components. However, when bonding occurs in the lab, the bonded abutment/prosthesis unit must then be removed from the analog for attachment to the implant. As the prosthesis is lifted from the analog, some or all of the cement layer can remain behind. When the prosthesis is then placed on the implant therefore, a gap exists between the implant shoulder and the prosthesis. This is not acceptable as it enables bacteria to enter the implant system and, in some cases, the interior of the implant itself, leading to infection, disease and implant failure.

An illustration of this problem is shown in FIGS. 1A and B. Here, an abutment 20 is attached to an implant analog 10 (FIG. 1A). The analog contains an identical reproduction of the abutment connection geometry, including planar coronally facing shoulder 108 of an implant 1. The abutment comprises an annular shoulder 21 which abuts the inner area of the analog shoulder 18. The outer area of the shoulder 18 is covered by the prosthesis 30. The prosthesis 30 is glued to the abutment 20. During this process, cement will often spill out from the join between abutment 20 and prosthesis 30 and form a layer between the analog shoulder 18 and the lower edge of the prosthesis. This means that the prosthesis does not sit flush on the analog shoulder. After bonding together, the abutment 20 and prosthesis 30 are removed from the analog 10 and placed on the implant 1, already in situ within the patient's mouth (FIG. 1B). If all, or a part, of the cement layer formed between the prosthesis and analog remains on the analog when the abutment/prosthesis unit is removed, then when the prosthesis is placed on the implant 1 a gap G, exaggerated for explanation purposes, will exist between the prosthesis 30 and the coronally facing shoulder 108 of the implant 1.

This problem can be avoided by creating an implant system in which only the abutment contacts the implant shoulder. However, this results in the abutment being visible between the implant and prosthesis, which can be aesthetically displeasing, especially when the abutment is formed of metal.

SUMMARY

It is therefore a problem to be solved by at least a preferred embodiment of the present invention to provide an implant analog which enables in-lab cementing of the prosthesis to the abutment while preventing a cementation gap being formed when the prosthesis is later connected to the implant. In other words, the present invention seeks to ensure a flush connection between the contacting surfaces of an implant and a final prosthesis prepared ex-situ.

GENERAL AND SPECIFIC DESCRIPTION OF THE INVENTION

According to one aspect the present invention provides, a dental implant system comprising a dental implant and an associated implant analog, the implant extending along a longitudinal axis from an apical end to a coronal end and comprising an external surface for anchoring and osseointegrating in bone, a coronal end portion having abutment connection geometry for cooperating with an abutment such that the abutment can be seated in one or more defined position on the implant, the abutment connection geometry comprising a coronally facing abutment contact surface which extends around the full circumference of the implant, and which in use directly contacts the abutment and provides a stop defining the axial location of the abutment relative to the implant, the coronal end portion further comprising a coronally facing prosthesis contact surface located radially beyond the abutment contact surface, the prosthesis contact surface being a continuous surface extending around the full circumference of the implant, the associated analog extending along a longitudinal axis from an apical end to a coronal end and comprising an external surface comprising an anti-rotation section having a non-circular symmetric cross-section in a plane perpendicular to the longitudinal axis for non-rotational fixation in a dental model, an analog head located at the coronal end of the analog, said head comprising abutment connection geometry for cooperating with an abutment such that the abutment can be seated in the same one or more defined position on the analog as it can on the implant, the abutment connection geometry comprising a coronally facing abutment contact surface, which in use directly contacts the abutment and provides a stop defining the axial location of the abutment relative to the analog, the head further comprising a coronally facing prosthesis contact surface located radially beyond the abutment contact surface, wherein the abutment contact surface of the analog has the same longitudinal cross-section and radial location relative to its longitudinal axis as at least a portion of the abutment contact surface of the implant about the entire circumference of the analog, such that the abutment contact surface of the analog matches at least a part of the abutment contact surface of the implant about its entire circumference, and wherein the prosthesis contact surface of the analog has the same longitudinal cross-section and location relative to its abutment contact surface and longitudinal axis as one or more portion of the prosthesis contact surface of the implant, such that the prosthesis contact surface of the analog matches one or more part of the prosthesis contact surface of the implant, the prosthesis contact surface of the analog being located at discrete locations about the circumference of the analog and/or at at least one radial location remote from the abutment contact surface of the analog, such that, in comparison to the prosthesis contact surface of the implant, the prosthesis contact surface of the analog is discontinuous in at least the circumferential and/or radial direction.

According to the present invention therefore, the surface of the analog which is arranged for contact with the prosthesis is shaped such that it contacts the prosthesis at only a few supporting points. This creates a discontinuous contact between the analog and the prosthesis. The prosthesis contact surface of the analog therefore provides support for the prosthesis while the discontinuities in the surface enable any cement overflow to drain away, rather than forming the problematic cement layer described above.

The discontinuous points of contact provided by the prosthesis contact surface of the analog enable the prosthesis to be positioned and cemented correctly on the abutment such that the prosthesis will sit flush on the prosthesis contact surface of the implant. In comparison to the prosthesis contact surface of the implant, the prosthesis contact surface of the analog is discontinuous in the circumferential and/or radial direction. Thus, in contrast to prior art systems, in which the analog exactly replicates the coronal end of the associated implant, in the present invention the analog has a modified prosthesis contact surface relative to the implant.

Despite this modification, the discontinuous prosthesis contact surface of the analog matches the prosthesis contact surface of the associated implant. By "matches" it is meant that the points making up the discontinuous prosthesis contact surface of the analog are identical to points on the continuous prosthesis contact surface of the implant, relative to the abutment contact surface and longitudinal axis of each component. Thus the prosthesis contact surface of the analog has the same longitudinal cross-section as the prosthesis contact surface of the implant at the same location when measured relative to the abutment contact surfaces and longitudinal axes of each component. This ensures that a prosthesis which lies flush on the discontinuous prosthesis contact surface of the analog will also lie flush on the continuous prosthesis contact surface of the implant when the bonded abutment-prosthesis unit is transferred to the implant.

The terms "identical" and "matches" as used throughout this specification are to be interpreted as taking into account manufacturing tolerances and the general limits of reproducibility of manufactured parts, meaning that the matching surfaces of the implant and analog of the present invention are identical only as far as practically possible.

While the prosthesis contact surface of the analog is discontinuous, the abutment contact surface of the analog matches at least a portion of the abutment contact surface of the implant about the entire circumference of the analog. By "matches" in this case it is meant that the points making up the abutment contact surface of the analog are identical to points on the abutment contact surface of the implant, relative to the longitudinal axis of each component. Thus the abutment contact surface of the analog has the same longitudinal cross-section as the abutment contact surface of the implant at the same radial location as measured relative to the longitudinal axis of the each component. As the abutment contact surface of the analog matches the abutment contact surface of the implant about the entire circumference of the analog, the abutment contact surface of the analog is therefore continuous in the circumferential direction. While the abutment contact surface of the analog matches the abutment contact surface of the implant about its entire circumference, it is not necessary for the abutment contact surface to match the entire abutment contact surface of the implant, i.e., the two surfaces may have different radial extents. However, preferably the abutment contact surface of the analog matches the entire abutment contact surface of the implant.

In accordance with conventional dental terminology, "apical" refers to the direction towards the bone and "coronal" to the direction towards the teeth. Therefore the apical end of a component is the end which, in use, is directed towards the jaw bone and the coronal end is that which is directed towards the oral cavity. In relation to an analog, or any other component which is not located in the mouth but is used in a model of the mouth, these terms refer to the ends of the component directed towards the modelled jaw bone and teeth (oral cavity) respectively.

By "coronally facing" it is meant that the surface in question extends in the radial direction, i.e. it has a radial dimension, and faces the coronal end of the component such that this is visible when the component is viewed from the coronal end. The surface can extend perpendicular to the longitudinal axis of the component or may slope in the coronal or apical direction relative to this. Coronally facing surfaces therefore provide stop surfaces against which a second component, placed onto the component from the coronal end, can rest.

According to the present invention, the implant comprises abutment connection geometry which comprises a coronally facing abutment contact surface. The abutment contact surface of the implant is located radially inwards of the prosthesis contact surface and provides a stop for defining the axial location of an abutment relative to the implant. The abutment contact surface of the implant is continuous in the circumferential direction. This provides a firm, closed stop surface for the abutment to rest upon in use, thus enabling force to be transmitted to the implant, and providing a seal against bacteria. The associated analog comprises an abutment contact surface which matches the abutment contact surface of the implant about the whole circumference of the analog. This provides a firm stop surface for the abutment to rest upon in use which matches the abutment contact surface of the implant. This ensures that the abutment sits on the analog in the same position, relative to the prosthesis contact surface, as on the implant. The fact that this surface is continuous prevents any tilting of the abutment and also avoids cement overspill from extending radially inwards, where it could interfere with other elements of the abutment connection geometry.

The implant and associated analog of the present invention are therefore intended for use in combination with an abutment, which is designed to contact the abutment contact surface of both the implant and analog. The discontinuous prosthesis contact surface of the analog assists the user in precisely bonding a prosthesis to the abutment in a manner which will ensure flush contact with the implant.

Preferably therefore the system further comprises an abutment having an apical portion and a coronal portion, at least the apical portion extending along a longitudinal axis, the apical portion comprising connection geometry for cooperation with the abutment connection geometry of the implant and analog, such that the abutment can be seated in the same one or more defined position on both the implant and abutment, said connection geometry comprising an apically facing contact surface complementary to the abutment contact surfaces of the implant and analog for directly contacting said abutment contact surfaces to define the axial location of the abutment relative to the implant and analog, said apically facing contact surface being continuous in the circumferential direction, wherein, when the abutment is seated on the implant, the contact surface of the abutment contacts the abutment contact surface of the implant about the entire circumference of the implant, the abutment being located radially inwards of the prosthesis contact surface such that this surface remains exposed, and when the abutment is seated on the analog, the apically facing contact surface of the abutment contacts the abutment contact surface of the analog about the entire circumference of the analog, the abutment being located radially inwards of the prosthesis contact surface such that this surface remains exposed, the abutment having the same location relative to the prosthesis contact surface of the analog as it has in relation to the prosthesis contact surface of the implant when seated on the implant.

By "apically facing" it is meant that the surface in question extends in the radial direction, i.e. it has a radial dimension, and faces the apical end of the component such that this is visible when the component is viewed from the apical end. The surface can extend perpendicular to the longitudinal axis of the component or may slope in the coronal or apical direction relative to this. Apically facing surfaces therefore provide stop surfaces which, when the component is placed onto a second component from the coronal end, can abut coronally facing surfaces of the second component.

According to this preferred embodiment, both the abutment contact surface of the analog and apically facing contact surface of the abutment are continuous in the circumferential direction wherein, when the abutment is seated on the analog, the two surfaces contact one another about the entire circumference of the analog such that a circumferentially closed contact is formed between the components. Preferably the surfaces are sized and shaped such that, when the abutment is seated on the analog, the outermost radial edges of the surfaces are in alignment. However, in some embodiments the apically facing contact surface can extend slightly radially beyond the abutment contact surface of the analog, as any cement overspill onto the underside of the abutment can be removed prior to connection to the implant. Similarly, in other embodiments, the abutment contact surface of the analog can extend slightly radially beyond the apically facing contact surface. In such embodiments however the prosthesis should be designed such that this does not contact the exposed area of the abutment contact surface of the analog.

The coronal portion of the abutment of the present invention is preferably intended for connection to a dental prosthesis. The coronal portion can extend along the same longitudinal axis as the apical portion or may be angled relative to this. In preferred embodiments the coronal portion comprises anti-rotation means on its external surface for cooperation with complementary anti-rotation means formed in a cavity of a dental prosthesis.

According to the present invention, the implant and associated analog comprise abutment contact surfaces which match one another about the circumference of the components. The abutment contact surface of implant, and hence also the abutment contact surface of the analog, is preferably linear in all longitudinal cross-sections, i.e. in all planes containing the longitudinal axis of the implant or analog respectively. Such a surface makes it easier to design and manufacture the complementary apically facing contact surface of the abutment. For the same reason it is preferable that the linear longitudinal cross-section is constant about the longitudinal axis of the implant or analog respectively.

As discussed above, implants are known whose coronal ends are scalloped or slanted. It is possible therefore for the axial height of the abutment contact surface of the implant, and hence also the abutment contact surface of the analog, to vary about the longitudinal axis of the implant or analog respectively, so as to create a scalloped or slanted surface. In such embodiments it is also possible for the longitudinal cross-section of the abutment contact surface of both the implant and analog to alter about the longitudinal axis. For example, the longitudinal cross-section of the abutment contact surface may change from horizontal to tapering towards or away from the axis and back to horizontal as the surface undulates around the axis. Alternatively, the cross-section may be tapered about the whole circumference of the implant, and hence associated analog, but the degree of taper may differ.

Preferably however, the abutment contact surface of the implant, and hence also the abutment contact surface of the associated analog, is circular symmetric about the longitudinal axis of the implant and analog respectively. In particularly preferred embodiments this surface also comprises a linear longitudinal cross-section, such that the abutment contact surface of the implant, and hence associated analog, is perpendicular to the longitudinal axis or slopes in a coronal or apical direction to this, so as to form a conical or frustoconical surface.

The apically facing contact surface of the abutment of a preferred embodiment of the present invention is complementary to the abutment contact surfaces of the implant and analog, and therefore this surface can be similarly scalloped, slanted or comprise a linear longitudinal cross-section that alters about the circumference of the abutment, as required. However, in preferred embodiments the apically facing contact surface of the abutment is circular symmetric and comprises a linear longitudinal cross-section.

In a similar manner to the abutment contact surface, the prosthesis contact surface of the implant, and hence also the prosthesis contact surface of the analog, is preferably linear in all longitudinal cross-sections. Such a surface makes it easier to design and manufacture a complementary surface of the prosthesis for contacting the prosthesis contact surface. For the same reason it is preferable that the linear cross-section is constant about the axis of the implant and analog respectively.

It is possible for the axial height of the prosthesis contact surface of the implant, and hence also the prosthesis contact surface of the analog, to vary about the longitudinal axis of the implant or analog respectively, so as to create a scalloped or slanted surface. In such embodiments it is also possible for the longitudinal cross-section of the prosthesis contact surface to alter about the longitudinal axis. As described above in relation to the abutment contact surfaces.

Preferably however, the prosthesis contact surface of the implant, and hence also the prosthesis contact surface of the associated analog, is circular symmetric about the longitudinal axis of the implant and analog respectively. In particularly preferred embodiments this surface also comprises a linear longitudinal cross-section, such that the prosthesis contact surface of the implant, and hence associated analog, is perpendicular to the longitudinal axis or slopes in a coronal or apical direction to this, so as to form a conical or frustoconical surface.

According to the present invention, the prosthesis contact surface of the analog is, in comparison to the prosthesis contact surface of the implant, discontinuous in at least the radial or circumferential direction. Thus, the prosthesis contact surface of the analog does not extend about the entire circumference of the analog and/or it begins at a radial location remote from the abutment contact surface. For the purposes of the present invention, a prosthesis contact surface radially spaced from the abutment contact surface, i.e. at a location remote from the radially outermost edge of the abutment contact surface, is considered as a discontinuous surface in the radial direction as a gap is formed between the abutment contact surface and prosthesis contact surface of the analog. As, in use, the prosthesis will be cemented to the exterior of the abutment, a radial gap between the abutment contact surface and the start of the prosthesis contact surface will create a radially discontinuous contact between the prosthesis and the analog.

The prosthesis contact surface of the analog is preferably formed by the coronal end of a plurality of circumferentially spaced struts or of one or more annular strut radially spaced from the abutment contact surface. The gaps between the struts, and/or the strut and the abutment contact surface, enable any cement overflow to drain away, while the prosthesis contact surface formed by the coronal end of the strut(s) matches that of the implant so as to form an accurately positioned support, relative to the abutment contact surface, for the prosthesis.

One or more annular strut radially spaced from the abutment contact surface of the analog, i.e. at a location remote from the radially outermost edge of the abutment contact surface, forms a radially discontinuous prosthesis contact surface while circumferentially spaced struts form a prosthesis contact surface which is discontinuous in the circumferential direction.

The struts can be formed, for example, by creating a surface which exactly replicates the prosthesis contact surface of the implant, relative to the abutment contact surface and longitudinal axis, and then forming circumferentially or radially extending grooves within this surface. Alternatively, circumferentially spaced struts can be formed by a surface whose height undulates about the longitudinal axis from a maximum height to a minimum height, thus forming a series of struts, wherein the surface matches the prosthesis contact surface of the implant only at the maximum height. Preferably however, the analog head comprises a sidewall extending apically from the radially outer edge of the abutment contact surface, said plurality of circumferentially spaced struts or one or more annular strut extending radially and axially from said side wall. This increases the depth of the gaps located between the struts and/or the strut and the abutment contact surface, thus facilitating the drainage of cement.

It is possible to design the struts such that the prosthesis contact surface of the analog is discontinuous in both the circumferential and radial directions. For example, a plurality of circumferentially spaced struts can be provided which extend over different radial extents. Alternatively, this can be achieved by designing the strut(s) such that only a portion or portions of the coronal end match the prosthesis contact surface of the implant. In the case of one or more annular strut, this can be achieved by providing one or more transverse groove in its coronal end which extends across the width of the strut. Alternatively, in the case of a plurality of circumferentially spaced struts, each strut may comprise one or more transverse grooves in its coronal end, the grooves being formed at equal or varying radial distances in each strut. Preferably however, it is preferred that the entire coronal end of each strut matches the prosthesis contact surface of the associated implant and thus forms the discontinuous prosthesis contact surface of the analog.

In order to minimize the possibility of cement residue forming between the coronal end of the strut(s) and the prosthesis, the coronal end of the strut(s) should be as narrow as possible while still providing the requisite strength to support the prosthesis. The strut(s) can have any shape, e.g. rectangular or rounded in their transverse cross-section, i.e. perpendicular to the longitudinal axis of the strut. However, preferably at least the coronal most part of the strut(s) has a triangular transverse cross-section. This increases the strength of the strut(s) while creating a narrow contact surface with the prosthesis. In addition, the tapered surfaces of the strut(s) help to direct any cement overspill away from the prosthesis. Preferably the struts are "roof shaped". In other words, the opposing sides of each strut taper evenly inwards towards one another in the coronal direction to create a central ridge, said ridge forming the discontinuous prosthesis contact surface.

When one or more annular strut is used, support is provided for the prosthesis about the whole circumference of the analog. This is beneficial as it prevents any tilting of the prosthesis out of the plane of the prosthesis contact surface. Preferably a plurality of radially spaced annular struts is provided, most preferably between two and four radially spaced struts. Preferably these struts are equally spaced in the radial direction. Providing multiple annular struts ensures that the prosthesis is supported across its radial thickness and thus ensures a flush fit across the radial width of the prosthesis contact surface of the associated implant.

In order to enable cement to flow freely into the gap between the abutment contact surface and annular strut, the strut should be located at a suitable radial distance from the abutment contact surface. The larger the gap the less chance of cement residue forming between the strut and prosthesis. Additionally, it is preferred that the radially inner side of the annular strut tapers outwardly in an apical direction from its coronal end, in order to direct any cement overspill away from the prosthesis contact surface. Leaving a large radial gap between the abutment contact surface and the prosthesis contact surface can however, in some systems, affect the correct alignment of the join between the abutment and prosthesis.

Therefore, preferably, the prosthesis contact surface of the analog is located at discrete locations about the circumference of the analog, such that, in comparison to the prosthesis contact surface of the implant, the prosthesis contact surface of the analog is discontinuous in at least the circumferential direction.

In preferred embodiments therefore, the prosthesis contact surface of the analog is formed by the coronal end of a plurality of circumferentially spaced struts such that the prosthesis contact surface is discontinuous at least in the circumferential direction.

A circumferentially discontinuous surface enables a discontinuous prosthesis contact surface to be formed while still providing firm support to the prosthesis at the location of the join to the abutment, which assists in accurate bonding of these components. A further advantage of a circumferentially discontinuous prosthesis contact surface, in particular circumferentially spaced struts, it that it is possible to utilise the circumferentially discontinuous nature of the prosthesis contact surface to assist in removal of any cement build up between the prosthesis and this surface. This can be done by rotating the abutment, and hence the bonded prosthesis, relative to the analog while the abutment is seated thereon. This rotation enables the prosthesis contact surface, preferably formed by the coronal ends of circumferentially spaced struts, to scrape off any cement residue on the underside of the prosthesis.

Preferably the plurality of circumferentially spaced struts are evenly spaced about the longitudinal axis of the analog. In order to provide suitable support to the prosthesis while minimizing the contact between the analog and prosthesis, it is preferred that the prosthesis contact surface is formed by three to eight circumferentially spaced struts, most preferably four. However, in other embodiments the analog may comprise a larger number of struts, e.g. 10, 12, 14 etc.

Preferably the surface of the analog head located between the circumferentially spaced struts curves or tapers radially outwards in the apical direction. This helps to direct any cement overspill away from the join between the analog and the prosthesis. In a preferred embodiment therefore the sidewall of the analog head from which the struts extend curves radially outwards in the apical direction.

As discussed above, the plurality of circumferentially spaced struts may be designed so as to form both a circumferentially and radially discontinuous prosthesis contact surface, e.g. by forming one or more transverse groove in each strut. However, preferably each circumferentially spaced strut extends the full radial length of the prosthesis contact surface and the entire coronal end of each strut forms the prosthesis contact surface. In this way the prosthesis contact surface of the analog is discontinuous in the circumferential direction only.

As discussed above, in preferred embodiments, both the abutment contact surface and prosthesis contact surface of the implant are circular symmetric about the longitudinal axis of the implant and have a linear longitudinal cross-section. Thus, in particularly preferred embodiments, the coronal ends of the plurality of circumferentially spaced struts have a uniform linear longitudinal cross-section.

According to the present invention, the implant and associated analog both comprise abutment connection geometry which comprises a coronally facing abutment contact surface.

In addition to the abutment contact surface, the abutment connection geometry of the implant and associated analog can comprise further features. As the analog of the present invention is designed such that an abutment can be seated on the analog in the same one or more defined position as it can on the implant, the abutment connection geometry of the analog will match the features of the abutment connection geometry of the implant, in the same location in relation to the abutment contact surface, to at least the extent necessary in order to enable this to occur. As the abutment connection geometry of the analog matches the abutment connection geometry of the implant, any abutment designed for connection to the implant can also be connected to the associated analog of the present invention in an identical manner.

In preferred embodiments the abutment connection geometry of the implant, and hence associated analog, comprises a blind bore extending along the longitudinal axis from the coronal end of the implant and analog respectively, said blind bore comprising a threaded section. This enables an abutment to be fastened to the implant and analog either directly or indirectly by threaded connection. Preferably the abutment is fastened to the implant and analog indirectly, via a separate screw, and hence in such embodiments the abutment of the present invention comprises a through bore for accommodating a screw.

When the implant and associated analog comprise a blind bore, the abutment contact surface of the implant, and hence associated analog, may be located within this blind bore, for example the abutment contact surface may be located at the coronal end of the blind bore and taper radially inwards in an apical direction to form a frustoconical surface. In such embodiments the apical portion of the associated abutment will therefore comprise a complementary tapered portion for accommodation within the bore, said tapered portion forming the apically facing contact portion of the abutment. Alternatively, the abutment contact surface of the implant and associated analog may be perpendicular to the longitudinal axis and be located within the blind bore at a location remote from the coronal end of the bore. In such embodiments the apical portion of the associated abutment will therefore comprise a complementary portion for accommodation within the bore, said complementary portion comprising an apically facing contact surface perpendicular to the longitudinal axis of the apical portion.

In preferred embodiments however, regardless of whether the abutment connection geometry comprises a blind bore, the abutment contact surface is located on the external coronal end surface of the implant, and hence associated analog. When a blind bore is present it is preferred that the abutment contact surface of the implant, and hence associated analog, surrounds the coronal end of the blind bore. This helps to seal the bore. In a particularly preferred embodiment the abutment contact surface of the implant, and hence associated analog, is perpendicular to the longitudinal axis and borders the coronal end of the blind bore. In such embodiments the apical portion of the associated abutment may comprise an apically extending portion for accommodation within the blind bore of the implant and analog and, coronally adjacent to and surrounding said apically extending portion, an apically facing contact surface, this surface being preferably perpendicular to the longitudinal axis of the apical portion.

Many implant systems comprise anti-rotation means, which prevent relative rotation between the implant and abutment and which set a finite number of rotational positions which the abutment can have relative to the implant. Such anti-rotation means ensure that the exact angular position of the abutment relative to the implant is known prior to final fixation of these components. This is beneficial, particularly when the implant system is intended to support a single tooth prosthesis (crown), as it can ensure correct alignment of the prosthesis with the surrounding teeth. In addition, anti-rotation means can help prevent loosening of the abutment during the lifetime of the implant.

These anti-rotation means consist of complementary non-circular symmetric portions in the implant and abutment, usually having a polygonal shape such as a hexagon or octagon. For example, an internal bore of the implant may comprise a section having a hexagonal cross-section, while the abutment comprises a portion having an equivalent hexagonal cross-section. Alternatively, the implant may comprise a male polygonal boss protruding from its coronal end, which in use is accommodated within a correspondingly shaped polygonal cavity within the abutment.

Preferably therefore, the abutment connection geometry of the implant, and hence the abutment connection geometry of the associated analog, further comprises anti-rotation means having a non-circular-symmetric cross-section in a plane perpendicular to the longitudinal axis of the implant or analog respectively, the anti-rotation means of the analog having a substantially identical cross-section to the anti-rotation means of the implant such that, in use, the anti-rotation means of the analog can cooperate with an abutment in order to seat the abutment in the same one or more defined angular positions relative to the analog as the abutment can be seated in in relation to the implant. Preferably the cross section of the analog anti-rotation means is identical to cross-section of the implant anti-rotation means.

In such preferred embodiments, the connection geometry of the preferred associated abutment preferably comprises anti-rotation means having a non-circular symmetric cross-section in a plane perpendicular to the longitudinal axis of the apical portion, said anti-rotation means being complementary to the anti-rotation means of the implant and analog such that the abutment can be seated on each component in the same one or more defined angular position. It is possible however for the connection geometry of the abutment to alternatively comprise a circular symmetric portion that can be accommodated by or accommodate the anti-rotation means of the implant and associated analog. This enables the abutment to be seated on the implant and associated analog in any angular orientation, as the circular symmetric portion will not engage the anti-rotation means of the implant and analog. Such abutments are used, for example, when constructing a bridge or arch which will be connected to multiple implants.

The anti-rotation means of the implant and analog and hence also the complementary anti-rotation means of the abutment, where present, can take the form of any anti-rotation means known in the art. For example, the anti-rotation means may have a polygonal cross-section or comprise a number of circumferentially spaced protrusions and/or grooves.

The implant and analog can both comprise a male boss protruding from their coronal end, the anti-rotation means being located on the external surface of said boss. In embodiments in which the implant and analog both comprise a blind bore however, it is preferred that the anti-rotation means are located on an internal surface of said bore, coronal of the threaded section.

In a particularly preferred embodiment the anti-rotation means of the implant and associated analog has a cross-section with four-fold rotational symmetry, such that an abutment having complementary anti-rotation means can be placed in four discrete angular orientations relative to the implant and analog respectively. Preferably the anti-rotation means has a square cross-section, most preferably with rounded corners.

As discussed above, when the prosthesis contact surface of the analog is formed by the coronal end of a plurality of circumferentially spaced struts, the struts can be used to scrape off any cement residue from the underside of the prosthesis by rotating the abutment and prosthesis relative to the analog. This is also possible when anti-rotation means are present on the analog and abutment. Due to manufacturing tolerances, all anti-rotation connections between dental implant components will allow some small degree of rotational play between the components. While it is generally desired to keep such play to a minimum, the present invention has also utilised this necessary inaccuracy between the anti-rotation means of the analog and abutment in order to assist with the removal of overspill cement. Preferably therefore, the width of the coronal end of each circumferentially spaced strut is less than the width of the arc of rotational play between the analog and abutment. In this way, while the anti-rotation means of the abutment and analog are engaged, the abutment can be "wiggled" clockwise and anti-clockwise such that the underside of the prosthesis is scraped back and forth against the struts of the prosthesis contact surface. This removes any cement layer which may have formed between the underside of the prosthesis and the discontinuous prosthesis contact surface.

As the play between the analog and abutment will result in a greater width of movement at greater radial distances, it is possible for the width (circumferential extent) of the coronal end of each strut to increase in the radial direction. This increases the support provided by the struts without reducing the ability of the system to completely scrape off the cement overspill from the prosthesis. However, preferably, for ease of manufacture, the coronal end of each strut has a uniform width. Preferably the width of the coronal end of each strut is less than 0.1 mm, more preferably less than 0.75 mm and most preferably around 0.5 mm. This is narrow enough that it will fall within the range of rotational play present in the anti-rotation means of most dental implant systems.

When the implant, and hence the associated analog, comprise an anti-rotation means having an n-fold symmetry, and the prosthesis contact surface of the analog is discontinuous in the circumferential direction, it is preferable that the prosthesis contact surface of the analog comprises n or 2n evenly circumferentially spaced struts. This symmetry increases the precision of the attachment of the prosthesis by preventing or limiting tilting of the prosthesis during bonding, which can occur if large gaps are left between the circumferentially spaced struts.

According to the present invention the implant, and hence the associated analog, comprises a coronally facing prosthesis contact surface. The prosthesis contact surface of the implant, and hence associated analog, is located radially beyond the abutment contact surface, i.e. on the radially outer side of the abutment contact surface. This is because, in use, the prosthesis will be placed over the abutment, and hence the prosthesis will contact the implant, and thus also the implant analog, at a location radially beyond the abutment.

The prosthesis contact surface and abutment contact surface of the implant, and hence associated analog, may be axially offset from one another. For example, when the abutment contact surface is formed within a blind bore of the implant and analog respectively, the prosthesis contact surface can be located on the external coronal end surface of the implant and associated analog. In some cases the prosthesis contact surface and abutment contact surface of the implant, and hence also the analog, can overlap each other in the axial dimension. For example, when the abutment contact surface is formed by a coronally outwardly tapering surface of a blind bore, the prosthesis contact surface may be formed by an apically outwardly tapering surface on the external coronal end surface of the implant and analog respectively. However, in preferred embodiments the abutment contact surface and prosthesis contact surface of the implant, and hence the associated analog, extend in the same plane, and hence in these embodiments the prosthesis contact surface can be seen as an extension of the abutment contact surface. In a particularly preferred embodiment, both the abutment contact surface and prosthesis contact surface of the implant, and hence associated analog, are perpendicular to the longitudinal axis of the implant and analog respectively and are located in the same axial plane on the exterior coronal surface of the implant and analog respectively.

Most usually the prosthesis contact surface of the implant is radially adjacent to the abutment contact surface, even in embodiments in which the two surfaces are axially remote from one another, or overlap in the axial dimension. This is because, as in use the prosthesis is bonded to the abutment, it is preferable to design the implant system such that a minimal gap exists between the prosthesis and abutment, particularly at the point of contact with the implant. Further, it is preferred that the coronal end of the implant comprises smooth surfaces to make this easier to sterilize and to prevent any grooves, undercuts or other discontinuities which could form bacteria traps. Preferably therefore the radially outer edge of the abutment contact surface of the implant is directly adjacent to the radially inner edge of the prosthesis contact surface, such that these surfaces contact one another. As mentioned above, preferably the abutment contact surface and prosthesis contact surface of the implant extend in the same plane. In such embodiments therefore the abutment contact surface and prosthesis contact surface can be viewed as the radially inner and radially outer portions respectively of a single surface. This is beneficial as it enables the implant to be used with abutments, not forming part of the present invention, which can contact the single surface over its entire length.

In embodiments in which the prosthesis contact surface of the analog is formed by one or more annular strut, a radial gap must always be present between the prosthesis contact surface and the abutment contact surface of the analog in order to create a gap for cement overspill. In embodiments in which the prosthesis contact surface of the analog is formed by the coronal end of a plurality of circumferentially spaced struts however, it is possible for the prosthesis contact surface of the analog to contact the radially outer edge of the abutment contact surface. Therefore, in such embodiments, preferably the prosthesis contact surface of the analog extends radially outwards from the radially outer edge of the abutment contact surface. Preferably the radially outer edge of the abutment contact surface of the analog is directly adjacent to the radially inner edge of the prosthesis contact surface, such that these surfaces contact one another.

In some preferred embodiments the prosthesis contact surface of the implant extends to the radially outermost edge of the coronal end portion, which usually forms or is equal to the widest part of the implant. This is particularly the case in so-called "tissue level" implant systems, in which the implant extends into the soft tissue rather than ending at the bone crest. This is because it is important in such systems that no over- or under-hang is formed between the prosthesis and the implant, as this can form a trap for bacteria as well as having an unaesthetic appearance. Furthermore, a system in which the apical end of the prosthesis matches the footprint of the implant gives the most support to the prosthesis as well as creating a natural "emergence profile" for the prosthetic tooth. In such preferred embodiments, the prosthesis contact surface of the associated analog extends to the radially outermost edge of the analog head.

In "bone level" implant systems however, in which the implant is embedded completely within the bone, it is common for a so-called "biological width" to be left between the radially outermost edge of the coronal end surface of the implant and the outer surface of the abutment/prosthesis connected to this. As such, the prosthesis contact surface of the implant may end at a point radially within the outer radius of the implant. However, in such systems it is common for the coronal end surface of the implant located radially beyond the prosthesis contact surface to form a continuation of this surface. Consequently, in such embodiments, the prosthesis contact surface of the analog may still extend to the radially outermost edge of the analog head as, particularly when circumferentially spaced struts are used, this eases manufacture of the analog. Alternatively the prosthesis contact surface may end radially inwards of the radially outer edge of the analog head. In such embodiments however, it is preferred that any coronally facing surface of the analog located radially beyond the prosthesis contact surface is located apical of the radially outer edge of the prosthesis contact surface, even if this does not match the equivalent portion of the implant. In this way this surface does not interfere with cement drainage.

In a particularly preferred embodiment of the present invention, the prosthesis contact surface of the analog extends from the radially outer edge of the abutment contact surface to the radially outer edge of the analog head and is formed by the coronal end of a plurality of circumferentially spaced struts. Preferably each strut extends the full radial length of the prosthesis contact surface, the entire coronal end of each strut matching the prosthesis contact surface of the implant, so as to form a circumferentially discontinuous but radially continuous prosthesis contact surface. In particularly preferred embodiments therefore, when the prosthesis contact surface of the implant, and hence associated analog, is circular symmetric about the longitudinal axis and has a linear longitudinal cross-section, the coronal end of each strut has a uniform linear longitudinal cross-section.

Additionally or alternatively, in a particularly preferred embodiment of the present invention the coronal end of the implant, and hence associated analog, comprises a blind bore extending along the longitudinal axis of the implant and analog respectively, the abutment contact surface of each component being directly adjacent to and surrounding the coronal end of the blind bore and forming a circumferentially continuous surface extending perpendicular to the longitudinal axis, the prosthesis contact surface of the implant and associated analog forming a continuation of the abutment contact surface, such that this surface also extends perpendicular to the longitudinal axis of each component, wherein the prosthesis contact surface of the implant is continuous in the circumferential direction and the prosthesis contact surface of the analog is formed by the coronal ends of a plurality of circumferentially spaced struts.

According to the present invention, the analog comprises an anti-rotation section on its external surface, in order to non-rotationally fix the analog in a dental model. The analog can be intended for permanent or removable fixation in the model. As well as direct (permanent or removable) fixation within a plaster model, the analog can also be intended indirect fixation within a plaster model, e.g. the analog can be intended for use in combination with a sleeve, the sleeve being permanently embedded in the model and the analog being removably inserted within this.

The anti-rotation section is preferably located apical of the analog head and may extend to the apical end of the analog or only along a portion of the analog. When the analog is intended for permanent fixation in the model it is usual for the external surface of the analog to comprise one or more grooves extending fully or partially around the circumference of the analog. These grooves form undercuts into which the modelling material extends and hardens, thus immovably axially retaining the analog. When the analog is intended for direct removable fixation in the model, no undercuts are formed. Instead the radial dimensions of the entire anti-rotation section, and any portion of the analog apical of this section, remain constant or decrease in the apical direction. This enables the analog to be withdrawn and reinserted into the model. When the analog is intended for indirect removeable fixation in the model, via, e.g. a sleeve, depending on the design of the sleeve it is possible for the analog to comprise small undercuts that enable a snap fit between the sleeve and analog. Such a snap fit provides aural and/or tactile feedback, to inform the user that the analog is correctly seated in the sleeve. This is only possible however if the formed snap fit connection is flexible enough to allow disengagement of the undercut such that the analog can be removed.

In any event, preferably the anti-rotation section of the analog comprises at least one planar surface extending in the axial direction, more preferably four planar surfaces equally spaced about the longitudinal axis. The one or more planar surfaces can taper inwards in the apical direction, however preferably the one or more planar surface extends parallel to the longitudinal axis of the analog.

The analog of the present invention is preferably made from a metal material such as titanium alloy, e.g. TAN, or stainless steel. It could also however be formed of ceramic or suitable polymer, e.g. PEEK.

The implant of the present invention can be formed of any known suitable material, such as, for example titanium or zirconium. Preferably however the implant is formed of a ceramic material, such as zirconia, preferably a stabilised zirconia, most preferably yttrium stabilised zirconia.

The implant comprises an external surface for anchoring and osseointegrating in bone. Preferably the external surface comprises a thread for anchoring the implant in bone. This thread can extend the full length of the implant or over only a section of this, preferably at least over the central half of the implant. The implant surface may alternatively or additionally be roughened, for example by acid etching and/or sandblasting, and/or comprise a coating, in order to improve the osseointegration properties of the implant.

As mentioned above, any abutment designed for connection to the implant of the present invention can also be connected to the analog of the present invention in an identical manner, due to the matching abutment connection geometry between the implant and analog.

The implant system of the present invention can comprise any known implant and abutment, in which the abutment contact surface does not contact the full radial extent of the coronal end of the implant and thus leaves a section of surface exposed to form a prosthesis contact surface on the implant. The inventive concept lies in providing an implant analog which does not replicate this prosthesis contact surface exactly but instead provides a discontinuous surface on order to allow cement drainage.

According to a further aspect therefore, the present invention provides an implant analog for use in the above described dental implant system. In a particularly preferred embodiment the present invention provides an implant analog, said analog extending along a longitudinal axis from an apical end to a coronal end and comprising an external surface comprising an anti-rotation section having a non-circular-symmetric cross-section in a plane perpendicular to the longitudinal axis for non-rotational fixation in a dental model, and an analog head located at the coronal end of the analog, said head comprising abutment connection geometry for cooperating with an abutment such that the abutment can be seated on the analog in one or more defined position, said abutment connection geometry including a coronally facing abutment contact surface, which in use directly contacts an abutment and provides a stop for defining the axial location of the abutment relative to the analog, the abutment contact surface being circular symmetric about the longitudinal axis and continuous in the circumferential direction and having a linear longitudinal cross-section, the head further comprising a coronally facing prosthesis contact surface for contacting a dental prosthesis, said surface being located radially beyond the abutment contact surface and being circular symmetric about the longitudinal axis of the analog and having a linear longitudinal cross-section, said prosthesis contact surface being formed by the coronal end of a plurality of circumferentially spaced struts or of one or more annular strut radially spaced from the abutment contact surface.

The above implant analog is intended for use in the dental implant system of the present invention and may comprise any or all of the preferred features listed above in relation to the analog.

According to a further aspect, the present invention provides a combination of an implant analog and abutment, the implant analog extending along a longitudinal axis from an apical end to a coronal end and comprising an external surface comprising an anti-rotation section having a non-circular symmetric cross-section in a plane perpendicular to the longitudinal axis for non-rotational fixation in a dental model, and an analog head located at the coronal end of the analog, said head comprising abutment connection geometry for cooperating with the abutment such that the abutment can be seated on the analog, said abutment connection geometry including a coronally facing abutment contact surface, which in use directly contacts the abutment and provides a stop defining the axial location of the abutment relative to the analog, the abutment contact surface being continuous in the circumferential direction, and the abutment comprising an apical portion and a coronal portion, at least the apical portion extending along a longitudinal axis, said apical portion comprising connection geometry for cooperation with the abutment connection geometry of the analog, said connection geometry including an apically facing contact surface for directly contacting the abutment contact surface of the analog to define the axial location of the abutment relative to the analog, said apically facing contact surface being complementary to the abutment contact surface of the analog and continuous in the circumferential direction, the head of the analog further comprising a coronally facing prosthesis contact surface for contacting a dental prosthesis, said surface being located radially beyond the abutment contact surface, said prosthesis contact surface being formed by the coronal end of a plurality of circumferentially spaced struts or of one or more annular strut radially spaced from the abutment contact surface, wherein, when the abutment is seated on the analog, the apically facing contact surface of the abutment contacts the abutment contact surface of the analog about the entire circumference of the analog, the abutment being located radially inwards of and not in contact with the prosthesis contact surface.

The analog and abutment can have any or all of the preferred features mentioned above. In particular the abutment contact surface, prosthesis contact surface and apically facing contact surface are all preferably circular symmetric about the longitudinal axis of the components and comprise a linear longitudinal cross-section.

The analog of the present invention enables a flush contact to be achieved between a prosthesis, which is bonded to an abutment ex-situ, and an implant.

Preferably therefore the system further comprises a dental prosthesis comprising abutment connection geometry for fixing the prosthesis to a coronal portion of the abutment in one or more defined position, said prosthesis further comprising an apically facing implant contact surface, said surface being complementary to the prosthesis contact surface of the implant and analog such that, when the prosthesis is connected to the abutment via the abutment connection geometry and the abutment is seated on the implant, the implant contact surface of the prosthesis contacts the prosthesis contact surface of the implant about the entire circumference of the implant and, when the prosthesis is connected to the abutment via the abutment connection geometry and the abutment is seated on the analog, the implant contact surface of the prosthesis contacts the entire surface of the discontinuous prosthesis contact surface of the analog.

As the prosthesis contact surface of the analog of the present invention is discontinuous, the analog, at least in isolation, does not enable a wax-up of the prosthesis to be built up on this surface. The analog could therefore be used in combination with a suitable burn out coping in order to create a wax-up of the prosthesis.

Alternatively the analog of the present invention can be provided in combination with a second analog, the second analog extending along a longitudinal axis from an apical end to a coronal end and comprising an external surface comprising an anti-rotation section having a non-circular-symmetric cross-section in a plane perpendicular to the longitudinal axis for non-rotational fixation in a dental model, and an analog head located at the coronal end of said second analog, said head comprising abutment connection geometry for cooperating with an abutment such that the abutment can be seated on the second analog in the same one or more defined position as on the analog, said abutment connection geometry including a coronally facing abutment contact surface, which in use directly contacts an abutment and provides a stop for defining the axial location of the abutment relative to the second analog, the abutment contact surface being continuous in the circumferential direction, the head further comprising a coronally facing prosthesis contact surface for contacting a dental prosthesis, located radially beyond the abutment contact surface, wherein the abutment connection geometry and prosthesis contact surface of the second analog match the abutment connection geometry and prosthesis contact surface of the analog about the entire circumference of the second analog, said prosthesis contact surface therefore being continuous in the circumferential direction.

The second analog therefore conforms to a standard, prior art analog in that the prosthesis contact surface of the analog is identical to the associated implant. The prosthesis can therefore be designed and created with reference to this second analog before being cemented to the abutment using the analog of the present invention.

The second analog can either be permanently placed in a separate but identical model to the analog of the present invention or, more preferably, both analogs can be removeably positioned in the same model.

In a particularly preferred embodiment the dental implant system further comprises a sleeve arranged for permanent fixation in a dental model, the inner surface of the sleeve having a complementary cross-section to the anti-rotation section of the analog and preferably second analog, such that the analog, and preferably the second analog, can be non-rotationally and removeably inserted into said sleeve. This enables a dental technician to easily swap between analogs.

BRIEF DESCRIPTION OF THE FIGURES

A preferred embodiment of the present invention shall now be described, with reference to the accompanying drawings, in which:

FIG. 1A shows a longitudinal cross-section of a prior art analog in combination with an abutment and prosthesis;

FIG. 1B shows a longitudinal cross-section of the abutment and prosthesis of FIG. 1A upon connection to a dental implant;

FIG. 2A shows a perspective view of a prior art analog component;

FIG. 2B shows a perspective view of a further prior art analog component;

FIG. 2C shows a perspective view of an implant associated with the analogs of FIGS. 2A and 2B;

FIG. 3 shows a coronal plan view of the analogs of FIGS. 2A and 2B and implant of FIG. 2C;

FIG. 7A shows detail X of FIG. 7;

DETAILED DESCRIPTION

Figure 4:
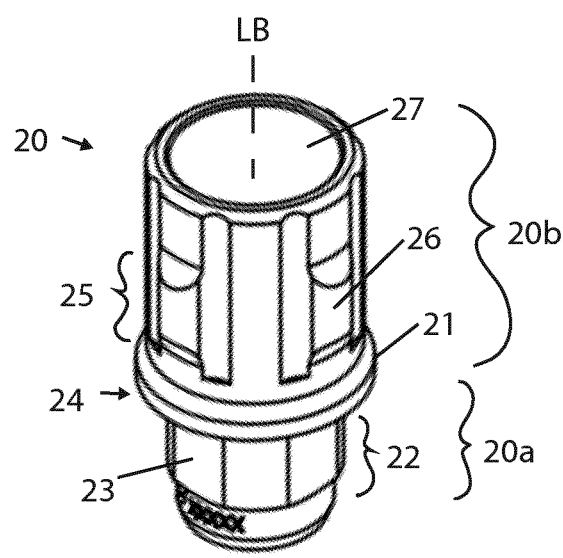
FIG. 4 shows a perspective view of an abutment suitable for use with the analogs of FIGS. 2A and 2B and implant of FIG. 2C.

As discussed above, FIGS. 1A and 1B demonstrate the problem that can occur when a standard analog 10 according to the prior art is used to cement together an abutment 20 and prosthesis 30.

This standard analog 10 is shown in more detail in FIG. 2A. Analog 10 extends along a longitudinal axis $L_A$ from an apical end 11 to coronal end 12. The external surface of the analog 10 comprises a non-circular-symmetric anti-rotation section 13. This section 13 is formed by axially extending planar surfaces 14 in the sidewall of the analog 10, which extend parallel to the longitudinal axis $L_A$. These surfaces 14 rotationally fix the analog 10 directly or indirectly in a model of the patient's mouth. As the anti-rotation section 13 and external surface of the analog 10 apical of this section 13 do not contain any undercuts, the analog 10 can be removeably fixed in the model.

FIG. 2B shows an alternative form of known analog 10a, which is designed for permanent fixture within a dental model. Like features are shown with like reference numerals. In contrast to analog 10, anti-rotation section 13a is formed by grooves 14a in the sidewall of the analog 10a which extend perpendicular to the longitudinal axis $L_A$. The grooves 14a have an approximately circular shape and form undercuts in the analog 10a. Once modelling material has hardened within these undercuts therefore the analog 10a cannot be removed from the model and is fixedly held in place within this.

A head 15, 15a is located at the coronal end 12, 12a of both analogs 10, 10a, but is shown in most detail in FIG. 2B. The head 15, 15a comprises an internal blind bore 16, 16a which extends into the analog 10, 10a along the longitudinal axis $L_A$. The blind bore 16, 16a comprises anti-rotation means 17, 17a in the form of a section of the bore having non-circular symmetric cross-section in a plane perpendicular to the longitudinal axis $L_A$. In the present embodiment the cross-section of the anti-rotation means 17, 17a takes the form of a square with rounded edges, although any known implant anti-rotation means could be used. Apical of the anti-rotation means 17, 17a, the blind bore 16, 16a further comprises a threaded section 19, 19a, which can be best seen in FIG. 3.

The coronal end surface 18, 18a of both analogs 10, 10a is planar and perpendicular to the longitudinal axis $L_A$. The end surface 18, 18a forms a shoulder on which an abutment and prosthesis can abut and stretches from the coronal end of the blind bore 16, 16a to the radially outermost edge of the analog head 15, 15a.

Both analogs 10, 10a are associated with implant 1, shown in FIG. 2C. That is, both analogs 10, 10a are designed to replicate the implant 1 in a physical model of the patient's mouth. The implant 1 extends along a longitudinal axis $L_I$ from an apical end 101 to a coronal end 102. The external surface of the implant 1 comprises a thread, shown in FIG. 1B, for anchoring the implant within the bone.

The coronal end portion 105 of the implant 1 comprises a blind bore 106 having anti-rotation means 107 and a threaded section 109 located apically of the anti-rotation means 107. The coronal end surface 108 of the implant is perpendicular to the longitudinal axis $L_I$, although in other implant systems this surface may taper apically or coronally or form a scalloped or sloped surface.

The analogs 10, 10a are designed to exactly replicate the blind bore 106, anti-rotation means 107 and coronal end surface 108 of the implant 1. Thus, when viewed from the coronal end, analogs 10, 10a and implant 1 are identical, as can be seen from FIG. 3.

FIG. 4 shows abutment 20. The apical portion 20a of abutment 20 comprises connection geometry 22 for connecting the abutment 20 to implant 1. This includes anti-rotation means 23 having a non-circular symmetric cross-section in a plane perpendicular to the longitudinal axis $L_B$ of the abutment 20. The anti-rotation means 23 is complementary to the anti-rotation means 107 of implant 1 and hence also the anti-rotation means 17, 17a of the associated analogs 10, 10a. This enables the abutment 20 to be inserted into the blind bore 106 of the implant 1, or bore 16, 16a of the associated analogs 10, 10a, and held in a rotationally fixed manner. The connection geometry 22 also comprises an apically facing contact surface 24 formed on the underside of annular shoulder 21. This contacts the coronal end surface 108 of the implant 1, and hence the equivalent surfaces 18, 18a of the associated analogs 10, 10a, in order to define and fix the axial location of the abutment 20 relative to the analogs 10, 10a and implant 1.

The coronal portion 20b of the abutment 20 comprises a second anti-rotation means 25, in this embodiment comprising four evenly spaced radial protrusions 26, which enables the abutment 20 to be connected in a rotationally fixed manner to a prosthesis. The abutment further comprises a through bore 27 forming a screw channel which enables the abutment 20 to be fastened to the implant 1 or analogs 10, 10a by means of a separate screw component 40.

Figure 5:
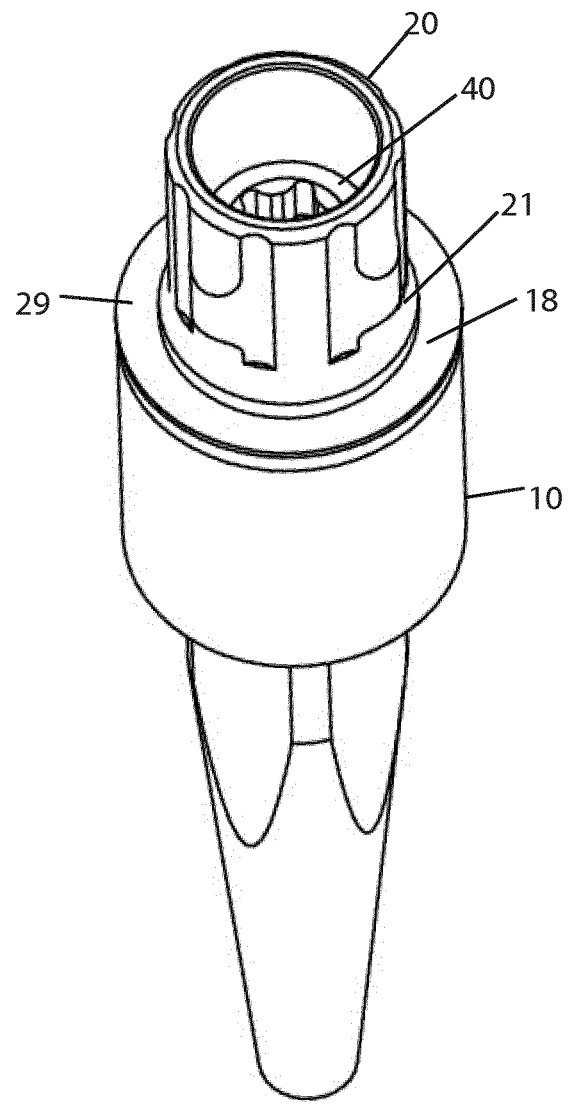
FIG. 5 shows a perspective view of the analog of FIG. 2A in combination with the abutment of FIG. 4.

FIG. 5 shows the abutment 20 connected to the analog 10 by screw 40. As is also seen from FIG. 1A, the abutment shoulder 21 has a smaller radius than coronal end surface 18, such that the outer portion of this surface 18 remains exposed. The inner area of coronal end surface 108, 18, 18a of the implant 1 and associated analogs 10, 10a thus form an abutment contact surface 28, 28a, 128, as can be seen in FIG. 3. The abutment contact surface 28, 28a, 128 and the apically facing contact surface 24 of the abutment 20 are complementary to one another such that continuous contact is formed about the circumference of the components.

The outer area of the coronal end surface 18 forms the prosthesis contact surface 29 of analog 10. As this surface is continuous in the circumferential and radial directions, and exactly matches the prosthesis contact surface 129 of the associated implant 1, this leads to the problem that a gap G can be formed between the implant 1 and prosthesis 30 due to cement residue forming on the prosthesis contact surface of the analog 10, as shown in FIG. 1B.

In the present embodiment abutment contact surface 128 and prosthesis contact surface 129 of the implant 1 are formed by the same planar, horizontal surface, such that the prosthesis contact surface 129 is an extension of abutment contact surface 128. These surfaces can however, differ from one another. For example, looking at FIG. 3, at the dotted line indicating the boundary between abutment contact surface 128 and prosthesis contact surface 129, the surface 108 may begin tapering downwards, to create a frustoconical prosthesis contact surface 129. Alternatively, the abutment contact surface 128 may be formed by a conically tapering inner wall of the bore 106, with the prosthesis contact surface 129 extending in a planar or tapered direction from the boundary of the bore 106.

Figure 6:
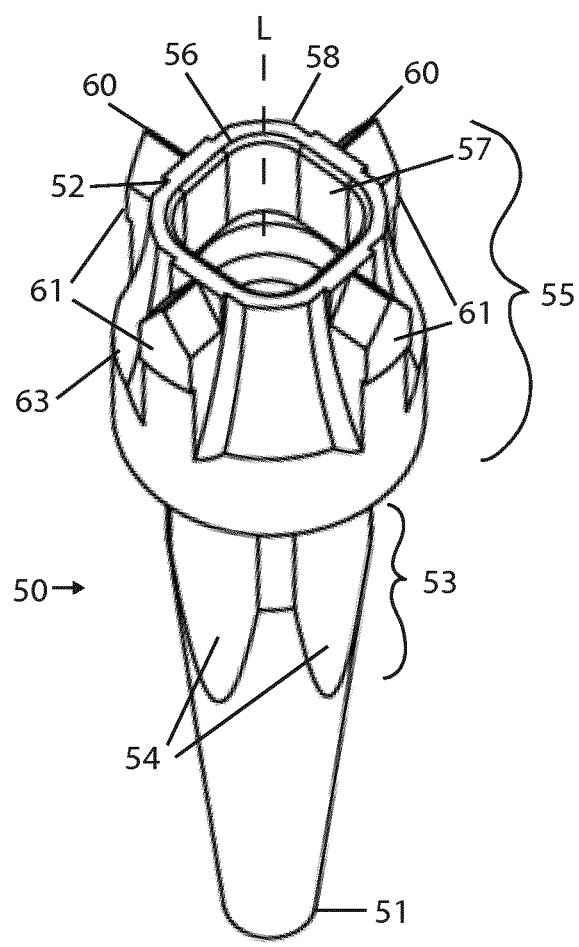
FIG. 6 shows a perspective view of an analog according to an embodiment of the present invention.
Figure 7:
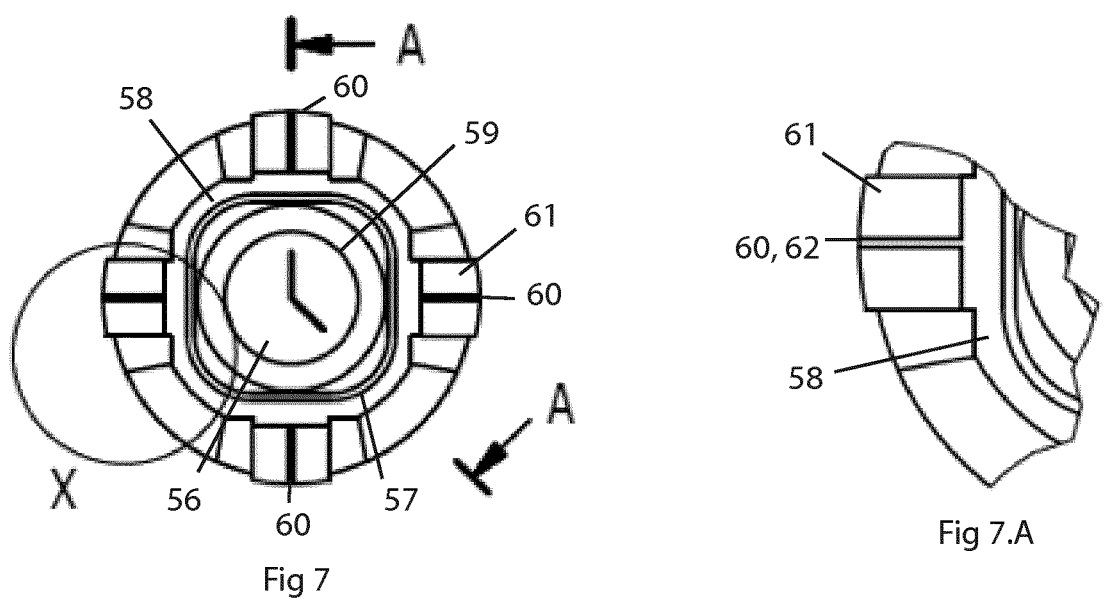
FIG. 7 shows a plan view of the analog of FIG. 6.

FIGS. 6 and 7 show an analog 50 in accordance with the present invention. The analog extends along a longitudinal axis L from apical end 51 to coronal end 52 and has an anti-rotation section 53 on its external surface. In the present embodiment this anti-rotation section is formed by four planar, axially extending surfaces 54 evenly spaced about the longitudinal axis L and running parallel to this. These surfaces 54 create a non-circular symmetric cross-section in a plane perpendicular to the longitudinal axis L and enable the analog 50 to be rotationally fixed directly or indirectly within a dental model.

An analog head 55 is provided at the coronal end 52 of the analog 50, coronal of the anti-rotation section 53. The analog head 55 comprises a blind bore 56 extending along longitudinal axis L. Blind bore 56 comprises anti-rotation means 57 in the form of a section of the bore having a non-circular symmetric cross-section in a plane perpendicular to the longitudinal axis L. In the present embodiment the cross-section of the anti-rotation means 57 takes the form of a square with rounded edges. Apical of the anti-rotation means 57 the blind bore 56 further comprises a threaded section 59.

The coronal end of the blind bore 56 is surrounded by an abutment contact surface 58, which in the present embodiment is a planar surface extending perpendicular to the longitudinal axis L. Directly adjacent to the radially outer edge of the abutment contact surface 58 and extending to the radially outermost edge of the analog head 55 is a discontinuous prosthesis contact surface 60. Unlike the analogs of the prior art, in which the prosthesis contact surface is continuous in both the circumferential and radial directions, the prosthesis contact surface 60 of the analog of the present invention is formed by the coronal end of a plurality of circumferentially spaced struts 61. This leads to gaps being created between the struts 61. In the present embodiment, each strut 61 extends the full radial length of the prosthesis contact surface 60. Four struts 61 are provided at evenly spaced intervals about the longitudinal axis L. The struts 61 are angularly aligned with the anti-rotation means 57, although in other embodiments more, e.g. eight, or less evenly spaced struts could be provided.

The struts 61 extend axially and radially from sidewall 63. The coronal most part of the struts 61 are triangular in their transverse cross-section. In particular, the struts 61 are roof shaped, such that each side of each struts 61 tapers evenly inwards towards one another in the coronal direction to form a central ridge 62. The ridges 62 are as narrow as possible to prevent, or at least limit, cement build up on these ridges 62. The ridges 62 form the prosthesis contact surface 60. The sidewall 63 of the analog head 55 between the struts 61 curves radially outwards in the apical direction in order to direct any cement overspill away from the coronal end of the analog 50.

Analog 50 is designed for use with implant 1. Thus, the abutment connection geometry of the analog 50, including the blind bore 56, matches the abutment connection geometry of the implant 1. The abutment contact surface 58 matches the abutment contact surface 128, such that abutment contact surface 58 forms a planar surface perpendicular to the longitudinal axis L at the same radial location relative to the longitudinal axis L as abutment contact surface 128 relative to axis L$_I$. The abutment contact surface 58 extends about the full circumference of the analog 50. Prosthesis contact surface 60 also matches prosthesis contact surface 129 of implant 1, such that prosthesis contact surface 60 has the same longitudinal cross-section, in this embodiment planar and perpendicular to the longitudinal axis L, as prosthesis contact surface 129 and in addition has the same axial and radial location relative to the longitudinal axis L and abutment contact surface 58 as portions of the prosthesis contact surface 129 relative to the longitudinal axis L$_I$ and abutment contact surface 128. In contrast to prior art analogs however, prosthesis contact surface 60 of analog 50 only matches the prosthesis contact surface 129 of the implant 1 at circumferentially spaced locations, such that the prosthesis contact surface 60 is discontinuous in comparison to the prosthesis contact surface 129 of the implant.

In the present embodiment, both the abutment contact surface 128 and prosthesis contact surface 129 of the implant 1, and hence the abutment contact surface 58 and prosthesis contact surface 60 of the analog 50, are planar and perpendicular to the their respective longitudinal axis L$_I$, L. However, the abutment contact surface 58 and prosthesis contact surface 60 of the analog 50 can be designed to match any shape of abutment contact surface 128 and prosthesis contact surface 129 of the implant 1.

Figure 8:
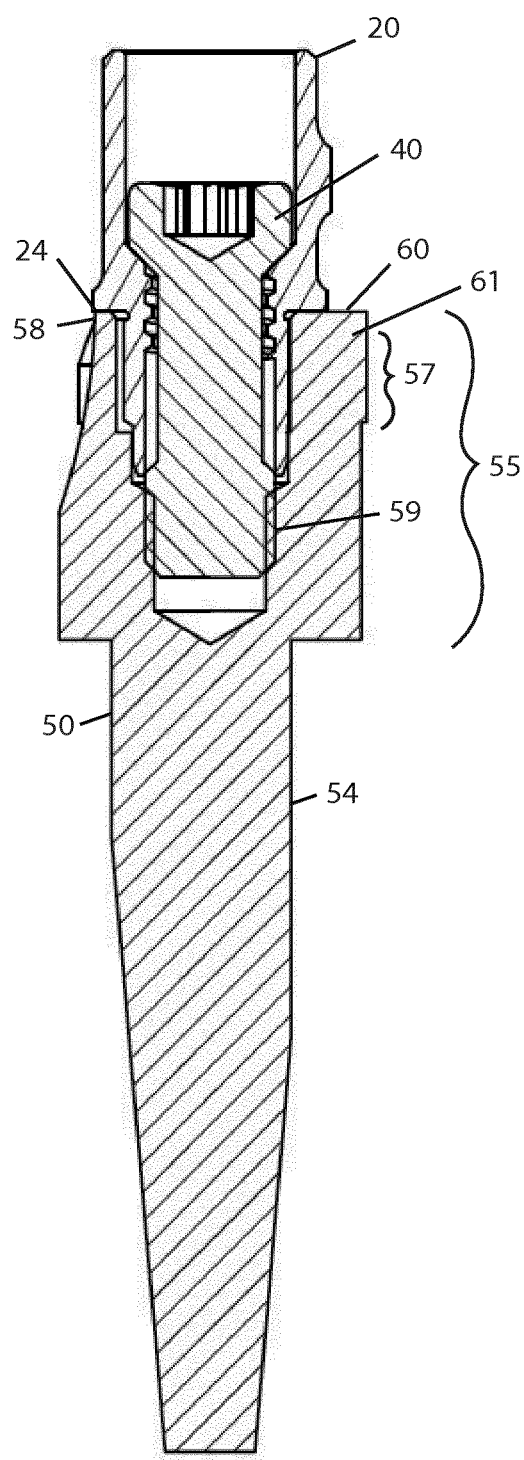
FIG. 8 shows a longitudinal cross-section of the analog of FIG. 6 in combination with the abutment of FIG. 4 taken along line A-A of FIG. 7.

FIG. 8 shows, in longitudinal cross-section along line A-A of FIG. 7, the abutment 20 of FIG. 4 in combination with analog 50. Here the differing radial extents of the abutment contact surface 58 and prosthesis contact surface 60 can be clearly seen. It can further be seen that the apically facing contact surface 24 of the abutment 20 fully contacts the abutment contact surface 58 of the analog 50 while the prosthesis contact surface 60 remains exposed beyond this. Thus, abutment 20 can be seated on analog 50 in an identical manner to how it is seated on implant 1, as the abutment connection geometry of the analog 50, including abutment contact surface 58, matches the abutment connection geometry of the implant 1, including abutment contact surface 128.

Figure 9:
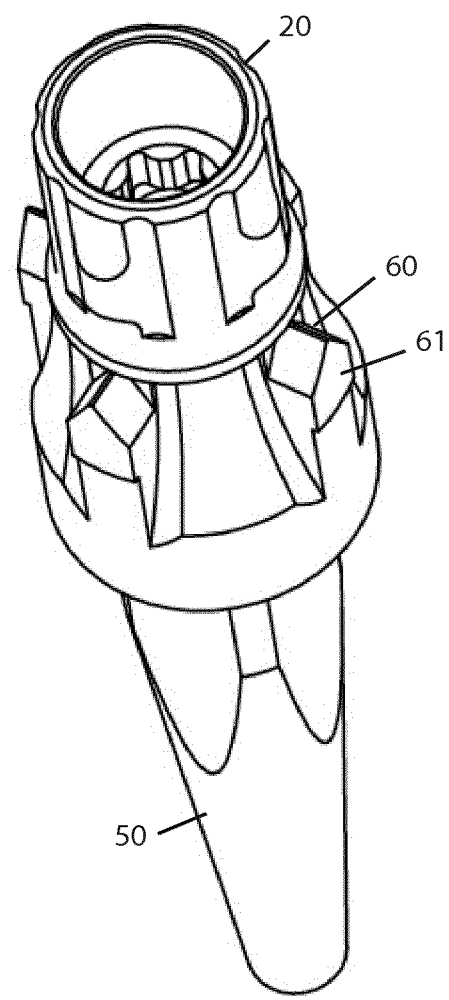
FIG. 9 shows a perspective view of the combination of FIG. 8.

As can be best seen in FIG. 9, the abutment shoulder 21 completely covers abutment contact surface 58 around the full circumference of the analog 50, thus sealing the blind bore 56 and preventing any cement from passing into this bore. Circumferentially spaced struts 61 extend radially beyond abutment 20 creating the discontinuous prosthesis contact surface 60. A prosthesis having a suitable cavity for accommodating the coronal portion of abutment 20 can thus be placed over abutment 20 until it rests on the prosthesis contact surface 60. As this surface 60 matches prosthesis contact surface 129 of the implant 1, it will correctly position the prosthesis, relative to the abutment 20, and support this during bonding to the abutment. Any cement which spills out from the abutment/prosthesis join will flow down the curved sidewall 63 of the analog head 55 between the struts 61. The struts 61 are narrow enough that by "wiggling" the abutment within the blind bore 56 any cement residue that has collected on the ridges 62 will be scraped off.

Figure 10:
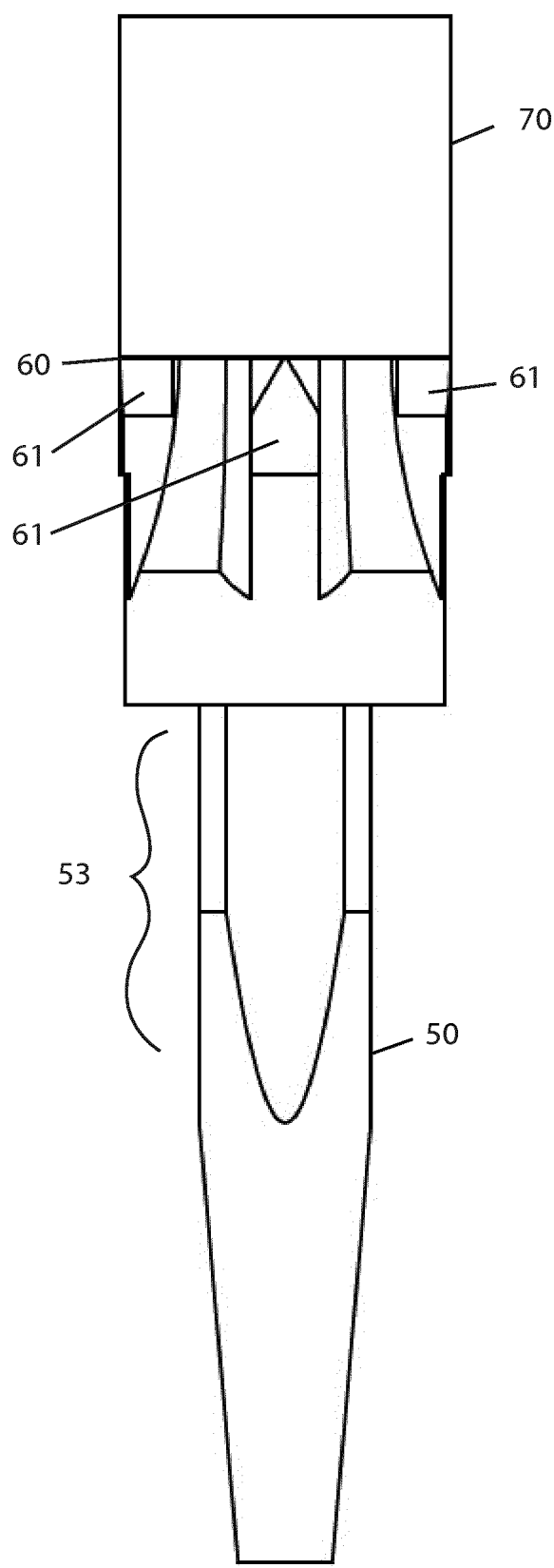
FIG. 10 shows the combination of FIG. 9 together with a prosthesis connected to the abutment.

FIG. 10 shows the combination of FIGS. 8 and 9 with a prosthesis 70. Prosthesis 70 completely encloses abutment 20 such that a single join is visible on the exterior of the system. The prosthesis 70 only contacts the analog 50 at the discontinuous prosthesis contact surface 60, formed by struts 61, such that cement can easily drain away from the underside of the prosthesis 70. When the abutment-prosthesis unit is placed on the implant 1 therefore the underside of the prosthesis will sit flush on the prosthesis contact surface 129 of the implant 1 about the full circumference, thus sealing the implant system.

The analog 50 is designed such that this can be placed either directly or indirectly in to a dental model. The anti-rotation section 53 and parts of the analog 50 apical of this have a uniform or apically decreasing radius, such that no undercuts are formed. This enables the analog 50 to be removeably placed in the model, although in alternative embodiments analog 50 could comprise a similar anti-rotation means 13*a* to analog 10*a* of FIG. 2B for permanent fixture within the model.

Figure 11:
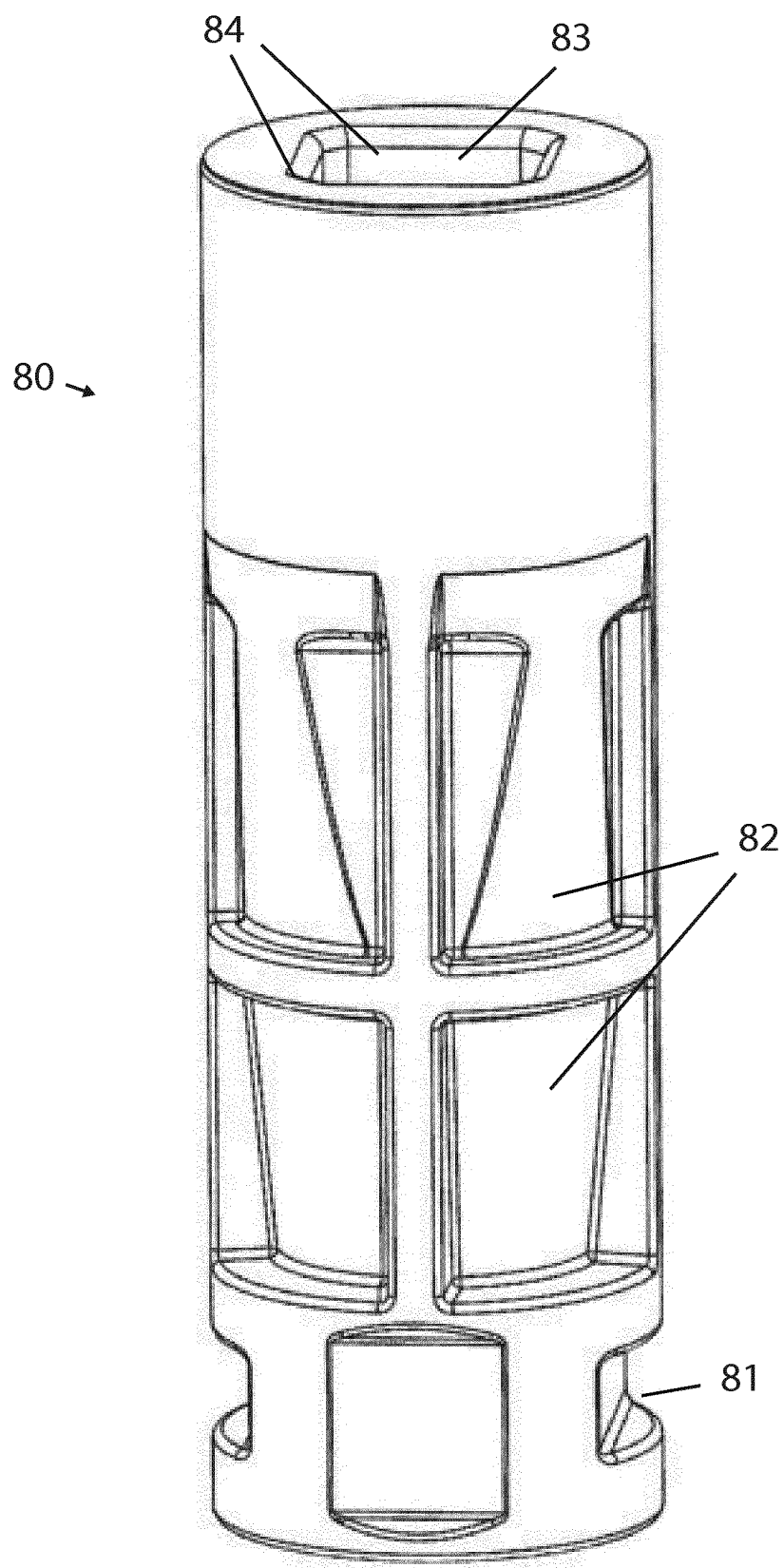
FIG. 11 shows perspective view of a sleeve which can optionally be used with the analog of FIG. 6.
Figure 12:
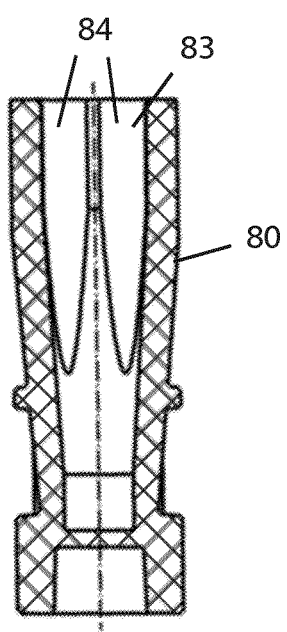
FIG. 12 shows a longitudinal cross-section through the sleeve of FIG. 11.

A sleeve 80 which can be used with the analog 50 is shown in FIGS. 11 and 12. The exterior of the sleeve comprises a plurality of grooves 81 and indents 82, which form undercuts that fix the sleeve 80 within hardened modelling material. The sleeve comprises a blind bore 83 which is complementary in shape to the external shape of the anti-rotation section 53 and apical portion of the analog 50. In particular, the blind bore 83 of the sleeve 80 comprises four planar surfaces 84 which correspond to the planar surfaces 54 of the analog 50, thus enabling this to be non-rotationally fixed within the sleeve. The analog 50 can be inserted and removed from the sleeve 80 as often as is necessary.

The sleeve 80 and analog 50 of the present invention can be used in combination with the traditional analog of FIG. 2A. This can be inserted into the sleeve 80 and abutment 20 connected to this during creation of the prosthesis 70. The prosthesis can thus be created having an underside which matches the continuous prosthesis contact surface 29 formed by the coronal end 18 of analog 10. Once the prosthesis is ready to be bonded to the abutment, analog 10 can be removed from the sleeve 80 and replaced with analog 50. The abutment is screwed to the analog 50 and prosthesis 70 pressed down onto the discontinuous prosthesis contact surface 60 in order to prevent any cement residue from forming.

Once bonded together the abutment-prosthesis unit can be screwed to the associated implant 1.

The above described embodiments are for illustrative purposes only and the skilled person will realize that alternative arrangements are possible which fall within the scope of the claims. For example, in other embodiments the discontinuous prosthesis surface of the analog may be formed by one or more annular strut located radially remote from the radially outer edge of the abutment contact surface. The abutment contact surface and/or prosthesis contact surface of the implant and analog may each taper in either the coronal or apical direction and may be located in different planes. These surfaces may also be scalloped or slanted. An analog having a discontinuous prosthesis contact surface and continuous abutment contact surface according to the present invention can be created in respect of any known dental implant system in which both the abutment and prosthesis are intended to abut against the implant. The present invention is further not limited to any particular form of anti-rotation means, in relation to any of the anti-rotation connections between the prosthesis and abutment, the abutment and analog/implant or the analog and sleeve/dental model. Any known anti-rotation means can be used within the scope of the present invention.

The invention claimed is:
1. A dental implant system comprising:
a dental implant (1) and an associated implant analog (50), the implant extending along a longitudinal axis ($L_I$) from an apical end (101) to a coronal end (102) and comprising an external surface configured for anchoring and osseointegrating in bone, a coronal end portion (105) having abutment connection geometry configured to cooperate with an abutment such that the abutment is seatable in one or more defined position on the implant, the abutment connection geometry comprising a coronally facing abutment contact surface (128) which extends around a full circumference of the implant, and which in use directly contacts the abutment and provides a stop defining an axial location of the abutment relative to the implant, the coronal end portion further comprising a coronally facing prosthesis contact surface (129) located radially beyond the abutment contact surface, the prosthesis contact surface being a continuous surface extending around the full circumference of the implant, the associated implant analog (50) extending along the longitudinal axis (L) from an apical end (51) to a coronal end (52) and comprising an external surface comprising an anti-rotation section (53) having a non-circular symmetric cross-section in a plane perpendicular to the longitudinal axis for non-rotational fixation in a dental model, an analog head (55) located at the coronal end of the analog, said head comprising abutment connection geometry for cooperating with an abutment such that the abutment can be seated in a same one or more defined position on the analog as on the implant, the abutment connection geometry comprising a coronally facing abutment contact surface (58), which in use directly contacts the abutment and provides a stop defining the axial location of the abutment relative to the analog, the head further comprising a coronally facing prosthesis contact surface (60) located radially beyond the abutment contact surface, wherein the abutment contact surface of the analog has a same longitudinal cross-section and radial location relative to the longitudinal axis as at least a portion of the abutment contact surface of the implant about an entire circumference of the analog, such that the abutment contact surface of the analog matches at least a part of the abutment contact surface of the implant about the entire circumference, and wherein the prosthesis contact surface of the analog has a same longitudinal cross-section and location relative to the abutment contact surface and longitudinal axis thereof as one or more portions of the prosthesis contact surface of the implant, such that the prosthesis contact surface of the analog matches one or more part of the prosthesis contact surface of the implant, the prosthesis contact surface of the analog being located at least at discrete locations about the circumference of the analog or at at least one radial location remote from the abutment contact surface of the analog, such that, in comparison to the prosthesis contact surface of the implant, the prosthesis contact surface of the analog is discontinuous in at least one of the circumferential or radial direction.

2. The dental implant system as claimed in claim 1, further comprising the abutment (20) having an apical portion (20a) and a coronal portion (20b), at least the apical portion extending along a longitudinal axis ($L_B$), the apical portion comprising connection geometry (22) for cooperation with the abutment connection geometry of the implant (1) and the analog (50), such that the abutment is seatable in a same one or more defined positions on both the implant and the abutment, said connection geometry comprising an apically facing contact surface (24) complementary to the abutment contact surfaces (128, 58) of the implant and the analog configured for directly contacting said abutment contact surfaces to define an axial location of the abutment relative to the implant and the analog, said apically facing contact surface being continuous in the circumferential direction, wherein, when the abutment is seated on the implant, the apically facing contact surface of the abutment contacts the abutment contact surface of the implant about the entire circumference of the implant, the abutment being located radially inwards of the prosthesis contact surface (129) such that said prosthesis contact surface remains exposed, and, when the abutment is seated on the analog, the apically facing contact surface of the abutment contacts the abutment contact surface of the analog about the entire circumference of the analog, the abutment being located radially inwards of the prosthesis contact surface (60) of the analog such that said prosthesis contact surface remains exposed, the abutment having the same location relative to the prosthesis contact surface of the analog as the abutment has in relation to the prosthesis contact surface of the implant when seated on the implant.

3. The dental implant system as claimed in claim 1, wherein the abutment contact surface (128) of the implant (1) and the abutment contact surface (58) of the analog (50), are linear in all longitudinal cross-sections thereof.

4. The dental implant system as claimed in claim 1, wherein the abutment contact surface (128) of the implant (1) and the abutment contact surface (58) of the analog (50) are circular symmetric about the longitudinal axis of the implant and the analog respectively.

5. The dental implant system as claimed in claim 1, wherein the prosthesis contact surface (129) of the implant (1) and the prosthesis contact surface (60) of the analog (50) are linear in respective longitudinal cross-sections thereof.

6. The dental implant system as claimed in claim 1, wherein the prosthesis contact surface (129) of the implant (1) and the prosthesis contact surface (60) of the analog (50) are circular symmetric about the longitudinal axis of the implant and the analog respectively.

7. The dental implant system as claimed in claim 1, wherein the prosthesis contact surface (60) of the analog (50) is formed by coronal ends of a plurality of circumferentially spaced struts (61) or of one or more annular strut radially spaced from the abutment contact surface (58).

8. The dental implant system as claimed in claim 7, wherein the analog head (55) comprises a sidewall (63) extending apically from a radially outer edge of the abutment contact surface (58), said plurality of circumferentially spaced struts (61) or one or more annular strut extending radially and axially from said side wall.

9. The dental implant system as claimed in claim 8, wherein the prosthesis contact surface (60) of the analog (50) is formed by the coronal ends of the plurality of circumferentially spaced struts (61) such that the prosthesis contact surface is discontinuous at least in the circumferential direction.

10. The dental implant system as claimed in claim 9, wherein each said circumferentially spaced strut (61) extends a full radial length of the prosthesis contact surface (60) of the analog (50) and an entirety of the coronal end of each strut forms the prosthesis contact surface.

11. The dental implant system as claimed in claim 9, further comprising the abutment (20) having an apical portion (20a) and a coronal portion (20b), at least the apical portion extending along a longitudinal axis ($L_B$), the apical portion comprising
connection geometry (22) for cooperation with the abutment connection geometry of the implant (1) and the analog (50), such that the abutment is seatable in a same one or more defined positions on both the implant and the abutment, said connection geometry comprising
an apically facing contact surface (24) complementary to the abutment contact surfaces (128, 58) of the implant and the analog configured for directly contacting said abutment contact surfaces to define an axial location of the abutment relative to the implant and the analog, said apically facing contact surface being continuous in the circumferential direction,
wherein, when the abutment is seated on the implant, the apically facing contact surface of the abutment contacts the abutment contact surface of the implant about the entire circumference of the implant, the abutment being located radially inwards of the prosthesis contact surface (129) such that said prosthesis contact surface remains exposed,
and, when the abutment is seated on the analog, the apically facing contact surface of the abutment contacts the abutment contact surface of the analog about the entire circumference of the analog, the abutment being located radially inwards of the prosthesis contact surface (60) of the analog such that said prosthesis contact surface remains exposed, the abutment having the same location relative to the prosthesis contact surface of the analog as the abutment has in relation to the prosthesis contact surface of the implant when seated on the implant, and
wherein a width of the coronal end of each said circumferentially spaced strut (61) is less than a width of an arc of rotational play between the analog (20) and the abutment (50).

12. The dental implant system as claimed in claim 11, wherein the radially outer edge of the abutment contact surface (58) of the analog (50) is directly adjacent to a radially inner edge of the prosthesis contact surface (60), such that said surfaces contact one another.

13. The dental implant system as claimed in claim 1, wherein the prosthesis contact surface (60) of the analog (50) extends to a radially outermost edge of the analog head (55).

14. The dental implant system as claimed in claim 1, wherein the abutment connection geometry of the implant (1) and the abutment connection geometry of the analog (50) comprise a blind bore (106, 56) extending along the longitudinal axis ($L_I$, L) from the coronal end (101, 51) of the implant and the analog respectively, said blind bores each comprising a threaded section (109, 59).

15. The dental implant as claimed in claim 1, wherein the abutment connection geometry of the implant (1) further comprises an anti-rotation element (107) having a non-circular-symmetric cross-section in a plane perpendicular to the longitudinal axis ($L_I$) of the implant and the abutment connection geometry of the analog (50) further comprises an anti-rotation element (57) having a non-circular-symmetric cross-section in a plane perpendicular to the longitudinal axis of the analog (L), wherein the anti-rotation means of the analog has an identical cross-section to the anti-rotation means of the implant.

16. The dental implant system as claimed in claim 1, wherein the abutment contact surface (128) and prosthesis contact surface (129) of the implant (1), and abutment contact surface (58) and prosthesis contact surface (60) of the analog (50), extend in the same plane.

17. The dental implant system as claimed in claim 2, further comprising a dental prosthesis (70) comprising abutment connection geometry for fixing the prosthesis to the coronal portion (20b) of the abutment (20) in one or more defined positions, said prosthesis further comprising an apically facing implant contact surface, said surface being complementary to the prosthesis contact surface (129) of the implant (1) and prosthesis contact surface (60) of the analog (50) such that,
when the prosthesis is connected to the abutment via the abutment connection geometry and the abutment is seated on the implant, the implant contact surface of the prosthesis contacts the prosthesis contact surface about the entire circumference of the implant and,
when the prosthesis is connected to the abutment via the abutment connection geometry and the abutment is seated on the analog, the implant contact surface of the prosthesis contacts the entire surface of the discontinuous prosthesis contact surface of the analog.

18. An implant analog (50) for use in the dental implant system as claimed in claim 1, said analog extending along a longitudinal axis (L) from an apical end (51) to a coronal end (52) and comprising
an external surface comprising an anti-rotation section (53) having a non-circular symmetric cross-section in a plane perpendicular to the longitudinal axis for non-rotational fixation in a dental model, and
the analog head (55) located at the coronal end of the analog, said head comprising
the abutment connection geometry configured for cooperating with the abutment such that the abutment is seatable on the analog, said abutment connection geometry including a coronally facing abutment contact surface (58), which in use directly contacts an abutment and provides a stop for defining an axial location of the abutment relative to the analog, the abutment contact surface being circular symmetric about the longitudinal axis and continuous in the circumferential direction and having a linear longitudinal cross-section, the head further comprising
the coronally facing prosthesis contact surface (60) for contacting a dental prosthesis (70), said surface being located radially beyond the abutment contact surface and being circular symmetric about the longitudinal axis of the analog and having a linear longitudinal cross-section, said prosthesis contact surface being formed by the coronal end of a plurality of circumferentially spaced struts (61) or of one or more annular struts radially spaced from the abutment contact surface.

19. A combination of an implant analog (50) and abutment (20), the implant analog extending along a longitudinal axis (L) from an apical end (51) to a coronal end (52) and comprising
an external surface comprising an anti-rotation section (53) having a non-circular symmetric cross-section in a plane perpendicular to the longitudinal axis for non-rotational fixation in a dental model, and an analog head (55) located at the coronal end of the analog, said head analog comprising abutment connection geometry for cooperating with the abutment (20) such that the abutment is seatable on the analog, said abutment connection geometry including a coronally facing abutment contact surface (58), which in use directly contacts the abutment and provides a stop defining an axial location of the abutment relative to the analog, the abutment contact surface being continuous in circumferential direction, the abutment (20) comprising an apical portion (20*a*) and a coronal portion (20*b*), at least the apical portion extending along a longitudinal axis ($L_{\bar{B}}$), said apical portion comprising connection geometry (22) for cooperation with the abutment connection geometry of the analog, said connection geometry comprising an apically facing contact surface (24) for directly contacting the abutment contact surface of the analog to define the axial location of the abutment relative to the analog, said apically facing contact surface being complementary to the abutment contact surface of the analog and continuous in the circumferential direction, the head of the analog further comprising a coronally facing prosthesis contact surface (60) for contacting a dental prosthesis (70), said surface being located radially beyond the abutment contact surface, said prosthesis contact surface being formed by the coronal end of a plurality of circumferentially spaced struts (61) or of one or more annular strut radially spaced from the abutment contact surface, wherein when the abutment is seated on the analog the apically facing contact surface of the abutment contacts the abutment contact surface of the analog about the entire circumference of the analog, the abutment being located radially inwards of and not in contact with the prosthesis contact surface.

* * * * *